United States Patent
Eidelman et al.

(10) Patent No.: US 11,189,431 B2
(45) Date of Patent: Nov. 30, 2021

(54) LOW PROFILE WET ELECTROLYTIC TANTALUM CAPACITOR

(71) Applicant: VISHAY SPRAGUE, INC., Bennington, VT (US)

(72) Inventors: Alex Eidelman, Beer Sheva (IL); Timothy Bishop, North Bennington, VT (US); Stephen Breithaupt, North Bennington, VT (US); Matthew Lang, Milford, CT (US); John Van Voorhis, North Bennington, VT (US); Andrey Mitiagin, Dimona (IL)

(73) Assignee: VISHAY SPRAGUE, INC., Bennington, VT (US)

( * ) Notice: Subject to any disclaimer, the term of this patent is extended or adjusted under 35 U.S.C. 154(b) by 101 days.

(21) Appl. No.: 16/036,162

(22) Filed: Jul. 16, 2018

(65) Prior Publication Data
US 2020/0020486 A1 Jan. 16, 2020

(51) Int. Cl.
*H01G 9/10* (2006.01)
*H01G 9/145* (2006.01)
(Continued)

(52) U.S. Cl.
CPC ............. *H01G 9/145* (2013.01); *H01G 9/008* (2013.01); *H01G 9/0032* (2013.01);
(Continued)

(58) Field of Classification Search
CPC .......... H01G 9/10; H01G 9/035; H01G 9/145; H01G 9/008; H01G 9/0425; H01G 9/0032
See application file for complete search history.

(56) References Cited

U.S. PATENT DOCUMENTS 2,089,686 A  8/1937 Clark et al.
2,686,892 A  8/1954 Lilienfeld
(Continued)

FOREIGN PATENT DOCUMENTS

CA  2452932 A1  6/2004
CN  101496197 A  7/2009
(Continued)

OTHER PUBLICATIONS

"New EP1 Wet Tantalum Capacitor Offers Industry-High Capacitance, Design Flexibility for Military and Avionics Systems," Vishay New Product Information, Sep. 2017 (2 pages).
(Continued)

*Primary Examiner* — David M Sinclair
(74) *Attorney, Agent, or Firm* — Volpe Koenig

(57) ABSTRACT

A capacitor may include a stack assembly. The stack assembly may include a plurality of anode plate members, each having an embedded wire. The anode plate members may be separated by at least one cathode foil sandwiched between separator sheets. A conducting member may electrically connect the embedded wires and may have an externally accessible end portion that is hermetically sealed from the interior of the capacitor. A case covers the stack assembly and may be attached to a cover. The case and cover may enclose the stack assembly within an interior area of the capacitor. The at least one cathode foil may be connected to the case. An electrolyte fluid may be disposed within the
(Continued)

interior area of the capacitor. A passage may be provided through a central portion of the stack assembly. A tube, surrounded by insulation, may pass through the passage and may be connected to the cover and the case.

19 Claims, 18 Drawing Sheets

(51) Int. Cl.
    *H01G 9/00*           (2006.01)
    *H01G 9/042*         (2006.01)
    *H01G 13/00*         (2013.01)
    *H01G 9/035*         (2006.01)
    *H01G 9/008*         (2006.01)

(52) U.S. Cl.
    CPC ........... *H01G 9/035* (2013.01); *H01G 9/0425* (2013.01); *H01G 9/10* (2013.01); *H01G 13/006* (2013.01)

(56) References Cited

U.S. PATENT DOCUMENTS

| | | |
|---|---|---|
| 2,834,926 A | 5/1958 | Booe |
| 2,871,425 A | 1/1959 | Burnham |
| 2,908,849 A | 10/1959 | Taylor |
| 3,138,746 A | 6/1964 | Burger et al. |
| 3,275,902 A | 9/1966 | McHugh et al. |
| 3,531,693 A | 9/1970 | Buice |
| 3,624,460 A | 11/1971 | Correll |
| 3,956,819 A | 5/1976 | Augeri |
| 3,976,922 A | 8/1976 | Peck et al. |
| 4,245,275 A | 1/1981 | Cannon |
| 4,377,404 A | 3/1983 | Hoshikawa et al. |
| 4,523,255 A | 6/1985 | Rogers |
| 4,546,415 A | 10/1985 | Kent et al. |
| 4,780,797 A | 10/1988 | Libby |
| 4,942,500 A | 7/1990 | Libby et al. |
| 4,987,519 A | 1/1991 | Hutchins et al. |
| 5,001,607 A | 3/1991 | Breithaupt |
| 5,043,849 A | 8/1991 | Libby |
| 5,105,341 A | 4/1992 | Stephenson et al. |
| 5,131,388 A * | 7/1992 | Pless ................. A61N 1/375 607/5 |
| 5,245,513 A | 9/1993 | Maijers et al. |
| 5,288,566 A | 2/1994 | Ginatta et al. |
| 5,334,219 A | 8/1994 | Kroll |
| 5,338,472 A | 8/1994 | Yokoyama et al. |
| 5,369,547 A | 11/1994 | Evans |
| 5,391,186 A | 2/1995 | Kroll et al. |
| 5,437,941 A | 8/1995 | Arledge et al. |
| 5,454,147 A | 10/1995 | Kobayashi et al. |
| 5,469,325 A | 11/1995 | Evans |
| 5,507,966 A | 4/1996 | Liu |
| 5,522,851 A * | 6/1996 | Fayram ................ A61N 1/3956 361/301.4 |
| 5,607,454 A | 3/1997 | Cameron et al. |
| 5,621,608 A | 4/1997 | Arai et al. |
| 5,673,168 A | 9/1997 | Efford et al. |
| 5,801,917 A | 9/1998 | Elias |
| 5,894,403 A | 4/1999 | Shah et al. |
| 5,926,362 A | 7/1999 | Muffoletto et al. |
| 5,959,830 A * | 9/1999 | Inagawa ................ H01G 9/155 361/502 |
| 5,982,609 A | 11/1999 | Evans |
| 6,146,786 A * | 11/2000 | Stadnick ............ H01M 10/654 429/101 |
| 6,157,531 A | 12/2000 | Breyen et al. |
| 6,197,184 B1 | 3/2001 | Hemphill et al. |
| 6,231,993 B1 | 5/2001 | Stephenson et al. |
| 6,238,444 B1 | 5/2001 | Cadwallader |
| 6,334,879 B1 | 1/2002 | Muffoletto et al. |
| 6,380,577 B1 | 4/2002 | Cadwallader |
| 6,400,554 B1 | 6/2002 | Shiraishi et al. |
| 6,509,588 B1 | 1/2003 | O'Phelan et al. |
| 6,522,524 B1 | 2/2003 | Feger et al. |
| 6,560,089 B2 | 5/2003 | Miltich et al. |
| 6,571,126 B1 | 5/2003 | O'Phelan et al. |
| 6,586,134 B2 | 7/2003 | Skoumpris |
| 6,594,140 B1 | 7/2003 | Evans et al. |
| 6,678,559 B1 * | 1/2004 | Breyen .................. A61N 1/375 361/503 |
| 6,687,118 B1 | 2/2004 | O'Phelan et al. |
| 6,707,660 B1 | 3/2004 | Evans et al. |
| 6,791,821 B1 | 9/2004 | Monnett |
| 6,801,424 B1 * | 10/2004 | Nielsen .................... H01G 9/08 361/517 |
| 6,807,048 B1 | 10/2004 | Nielson et al. |
| 6,819,544 B1 * | 11/2004 | Nielsen ................. H01G 9/042 361/508 |
| 6,850,405 B1 | 2/2005 | Mileham et al. |
| 6,859,353 B2 * | 2/2005 | Elliott .................... H01G 9/008 29/25.41 |
| 6,875,318 B1 | 4/2005 | Gabriele et al. |
| 6,946,220 B2 | 9/2005 | Probst et al. |
| 6,952,339 B1 | 10/2005 | Knowles |
| 6,957,103 B2 | 10/2005 | Schmidt et al. |
| 7,012,799 B2 | 3/2006 | Muffoletto et al. |
| 7,038,901 B2 | 5/2006 | Muffoletto et al. |
| 7,072,171 B1 | 7/2006 | Muffoletto et al. |
| 7,085,126 B2 | 8/2006 | Muffoletto et al. |
| 7,092,242 B1 | 8/2006 | Gloss et al. |
| 7,118,828 B2 | 10/2006 | Dodd et al. |
| 7,164,574 B2 | 1/2007 | Barr et al. |
| 7,169,284 B1 | 1/2007 | Jiang et al. |
| 7,271,994 B2 | 9/2007 | Stemen et al. |
| 7,274,551 B1 | 9/2007 | Parler, Jr. et al. |
| 7,355,840 B2 | 4/2008 | Doffing et al. |
| 7,419,873 B2 | 9/2008 | Doffing et al. |
| 7,483,260 B2 | 1/2009 | Ziarniak et al. |
| 7,531,010 B1 | 5/2009 | Feger et al. |
| 7,705,110 B2 | 4/2010 | Anderson |
| 7,710,713 B2 | 5/2010 | Restorff et al. |
| 7,715,174 B1 | 5/2010 | Beauvais et al. |
| 7,733,631 B2 * | 6/2010 | Brabeck ................. A61N 1/375 361/302 |
| 7,813,107 B1 | 10/2010 | Druding et al. |
| 7,983,022 B2 | 7/2011 | O'Connor et al. |
| 8,086,312 B2 | 12/2011 | Nielsen et al. |
| 8,238,079 B1 | 8/2012 | Knowles |
| 8,259,435 B2 | 9/2012 | Millman et al. |
| 8,339,769 B2 | 12/2012 | Schott et al. |
| 8,405,956 B2 | 3/2013 | Dressig et al. |
| 8,451,586 B2 | 5/2013 | Priban |
| 8,477,479 B2 | 7/2013 | Pease et al. |
| 8,576,544 B2 | 11/2013 | Rawal et al. |
| 8,605,411 B2 | 12/2013 | Biler et al. |
| 8,687,347 B2 | 4/2014 | Bates et al. |
| 9,070,512 B2 | 6/2015 | Breithaupt et al. |
| 9,076,592 B2 | 7/2015 | Masheder et al. |
| 9,105,401 B2 | 8/2015 | Dreissig et al. |
| 9,737,724 B2 | 8/2017 | Eidelman et al. |
| 9,859,065 B1 * | 1/2018 | Lim ...................... H01G 9/26 |
| 9,947,479 B2 | 4/2018 | Eidelman et al. |
| 10,176,930 B2 * | 1/2019 | Eidelman ............... H01G 9/035 |
| 2003/0011967 A1 | 1/2003 | Nielsen et al. |
| 2003/0088293 A1 | 5/2003 | Clarke et al. |
| 2004/0120099 A1 | 6/2004 | Elliott et al. |
| 2004/0127952 A1 * | 7/2004 | O'Phelan ............... H01M 6/005 607/36 |
| 2004/0195093 A1 | 10/2004 | Cohen et al. |
| 2004/0225327 A1 | 11/2004 | Norton et al. |
| 2004/0240149 A1 | 12/2004 | Lessner et al. |
| 2005/0077342 A1 | 4/2005 | Chen et al. |
| 2005/0177193 A1 | 8/2005 | Nielsen et al. |
| 2005/0180094 A1 | 8/2005 | Muffoletto et al. |
| 2005/0195558 A1 | 9/2005 | Goldberger et al. |
| 2005/0219787 A1 | 10/2005 | Stevenson et al. |
| 2005/0264979 A1 * | 12/2005 | Breyen ................... H01G 9/04 361/517 |
| 2006/0012945 A1 | 1/2006 | Doffing et al. |
| 2006/0018079 A1 | 1/2006 | Barr et al. |

(56) References Cited

U.S. PATENT DOCUMENTS

| | | |
|---|---|---|
| 2006/0023400 A1 | 2/2006 | Sherwood |
| 2006/0279906 A1 | 12/2006 | Stemen et al. |
| 2006/0279907 A1 | 12/2006 | Doffing et al. |
| 2006/0291140 A1 | 12/2006 | Kazaryan et al. |
| 2007/0211412 A1 | 9/2007 | Fife et al. |
| 2007/0211413 A1 | 9/2007 | Fife et al. |
| 2008/0026286 A1 | 1/2008 | Cui et al. |
| 2008/0068779 A1 | 3/2008 | Restorff et al. |
| 2008/0151474 A1 | 6/2008 | Ziarniak et al. |
| 2008/0170353 A1 | 7/2008 | Swanson |
| 2008/0232029 A1 | 9/2008 | Ning |
| 2008/0232030 A1 | 9/2008 | Jones et al. |
| 2008/0232032 A1 | 9/2008 | Jones et al. |
| 2008/0247122 A1 | 10/2008 | Vaisman et al. |
| 2009/0073638 A1 | 3/2009 | Fujii et al. |
| 2009/0273885 A1 | 11/2009 | Jiang et al. |
| 2010/0134955 A1 | 6/2010 | O'Connor et al. |
| 2010/0175235 A1 | 7/2010 | Nielsen et al. |
| 2010/0268292 A1 | 10/2010 | Eidelman et al. |
| 2010/0297495 A1* | 11/2010 | Casby ............... H01G 9/06 429/185 |
| 2010/0318142 A1 | 12/2010 | Chen |
| 2012/0087062 A1 | 4/2012 | Kurita |
| 2012/0106029 A1 | 5/2012 | Galvagal |
| 2012/0127632 A1* | 5/2012 | Evans ............... H01G 9/022 361/504 |
| 2012/0179217 A1 | 7/2012 | Bates et al. |
| 2012/0257327 A1 | 10/2012 | Zednickova et al. |
| 2013/0095299 A1 | 4/2013 | Evans |
| 2014/0104755 A1 | 4/2014 | Hagiwara et al. |
| 2014/0268499 A1 | 9/2014 | O'Phelan et al. |
| 2015/0127060 A1 | 5/2015 | Eidelman et al. |
| 2015/0179349 A1 | 6/2015 | Biler et al. |
| 2016/0189876 A1 | 6/2016 | Djebara et al. |
| 2016/0336115 A1* | 11/2016 | Kaiser ............... B02C 19/186 |
| 2017/0140876 A1 | 5/2017 | Eidelman et al. |
| 2017/0207031 A1 | 6/2017 | Eidelman et al. |

FOREIGN PATENT DOCUMENTS

| | | |
|---|---|---|
| EP | 0491178 A1 | 6/1992 |
| EP | 1053763 A2 | 11/2000 |
| GB | 760761 | 11/1956 |
| GB | 794631 | 5/1958 |
| GB | 1055362 | 1/1964 |
| GB | 2036432 | 6/1980 |
| JP | 56-169534 U | 12/1981 |
| JP | 02-280310 A | 11/1990 |
| JP | 3-41921 U | 4/1991 |
| JP | 05-234814 A | 9/1993 |
| JP | 09-326327 A | 12/1997 |
| WO | 94/00193 A1 | 1/1994 |
| WO | 01/57928 A1 | 8/2001 |
| WO | 02103728 A1 | 12/2002 |
| WO | 2004/049361 A1 | 6/2004 |
| WO | 2005/001997 A1 | 1/2005 |
| WO | 2006/127663 A2 | 11/2006 |
| WO | 2007/064372 A1 | 6/2007 |
| WO | 2008084314 A1 | 7/2008 |
| WO | 2010/121018 A1 | 10/2010 |

OTHER PUBLICATIONS

"Wet Tantalum Capacitors, High Energy, Ultra High Capacitance, −55° C. to +125° C. Operation," Vishay Datasheet, Document No. 42107, Jun. 19, 2017 (8 pages).

"Wet Tantalum Capacitors, High Energy, Ultra High Capacitance, −55° C. to +125° C. Operation" Vishay Product Sheet, 2017 (2 pages).

* cited by examiner

LOW PROFILE WET ELECTROLYTIC TANTALUM CAPACITOR

FIELD OF INVENTION

This application relates to the field of electronic components, and more specifically, capacitors.

BACKGROUND

Wet capacitors are used in the design of circuits due to their volumetric efficiency, stable electrical parameters, high reliability and long service life. Such capacitors typically have a larger capacitance per unit volume than certain other types of capacitors, making them valuable in high-current, high-power, and low-frequency electrical circuits. One type of wet capacitor is a wet electrolytic capacitor. A wet electrolytic capacitor includes two conducting surfaces (an anode and a cathode) whose function is to store electrical charge, and a fluid electrolyte. An insulating material or dielectric separates the two conducting surfaces. Wet electrolytic capacitors tend to offer a good combination of high capacitance and low leakage current.

Wet electrolytic capacitors are basic to various types of electrical equipment from satellites, aerospace, airborne, military group support, oil exploration, power supplies, and the like. In any of these example applications, the capacitor may be exposed to harsh environmental conditions, including extreme temperatures, pressure, moisture, shock, vibration, and the like. The capacitor must be able to withstand these harsh environmental conditions while maintaining its accuracy, service life, and ability to be powered at very high temperatures with no maintenance. Failure of a capacitor due to harsh environmental conditions would necessitate its removal for repairs, which would result in delays and other associated expenses. Additionally, many of these example applications include significant dimensional or layout constraints, as the field of electronics is consistently demanding smaller parts and devices. For example, reductions in both mounting area and component profile (i.e., height) are highly demanded in most current applications.

Known wet electrolytic capacitors, such as Tantalum (Ta) electrolytic capacitors, are generally characterized as having a cylindrical shape and axial leaded terminations. Tantalum electrolytic capacitors known in the art may use tantalum for the anode material. The tantalum anode body (also commonly referred to as a "slug" or "pellet") is usually sintered. A wire (which may also be formed of tantalum) is commonly formed in the anode body in one of two ways: (1) "embedded," meaning the wire is encased in tantalum powder during a pressing process; or (2) "welded," meaning after the pellet is pressed and sintered, the wire is welded to the tantalum anode body. The other end of the wire extends outside of the tantalum anode body. The capacitor dielectric material made by anodic oxidation of the anode material to form an oxide layer over the surface of the anode body (e.g., Ta to $Ta_2O_5$). A capacitor cathode may be formed by coating an inner surface of the body or case of the capacitor that encloses the tantalum anode body. The cathode may be formed of sinter tantalum or electrophoretically deposited tantalum or any other method known in the art, and coupled to a cathode terminal. A fluid electrolyte separates the cathode and the anode body and provides for electrical communication between the cathode and anode body. Although cylindrical shaped capacitors with axial leaded terminations generally perform reliably in harsh environmental conditions, their provided energy density is limited by their cylindrical shape and limited surface area of their surfaces (anode and cathode), as the surface area of the two surfaces determines the capacitance of the capacitor. Additionally, dimensional constraints often make their application difficult.

Other types of known wet electrolytic capacitors are characterized as having a circular or square shaped capacitor body or "can" with radial leaded terminations. While circular or square shaped capacitors with radial leaded terminations may provide higher energy density when compared to cylindrical shaped capacitors with axial leaded terminations, their ability to operate in harsh environmental conditions is limited. For example, circular or square shaped capacitors with radial leaded terminations generally are more susceptible to elevated temperatures that cause capacitor swelling. Additionally, circular or square shaped capacitors with radial leaded terminations generally have limited ability to survive in high shock or vibration environments.

At present, a need exists for an improved wet electrolytic capacitor capable of operating in harsh environmental conditions characterized by high energy density and a low profile to comply with common dimensional constraints.

SUMMARY

A capacitor is disclosed including a stack assembly which may comprise a stack of capacitor elements. The stack assembly may include a plurality of anode plate members. Each of the plate members may have an embedded wire. The anode plate members are separated by at least one cathode foil provided between adjacent anode plate members. The cathode foil is separated from the anode plate members by separator sheets. A conducting member electrically connects the embedded wires and may have an externally accessible end portion. A case covers the stack assembly and is attached to a cover assembly. The case and cover assembly enclose the stack assembly within an interior area of the capacitor. The cathode foil is connected to the case. An electrolyte fluid is disposed within the interior area of the capacitor. A preferably cylindrical passage is provided through a central portion of the stack assembly and an upper wall of the case. A first tube is provided passing through the cylindrical passage. The first tube is surrounded by an insulating tube. A stack assembly separator may be positioned between the stack assembly and the cover. The stack assembly may include a plurality of cathode foils with a tab extending from each cathode foil. The tabs are connected to each other and to the case.

The stack assembly may include an angled sidewall formed at aligned corners of the anode plate members, the separator sheets, and the cathode foil. The angled sidewall may form a cavity within the interior area of the capacitor, with the cavity providing space for the embedded wires and conducting member.

The first tube may be formed integrally with the cover. A top portion of the first tube may be welded to the upper wall of the cover.

The capacitor cover may be connected to a base. The base may comprise a mounting base for attaching the capacitor to a surface. The base may include a first contact pad in contact with an outer surface of the case, and a second contact pad in contact with the end portion of the conducting member. The base may form a surface mount assembly for connecting the capacitor to an electronic circuit.

According to another aspect of the invention, a capacitor may include a stack assembly. The stack assembly includes a first anode plate member having an upper surface, a lower surface and peripheral sidewalls. The first anode plate member includes a first embedded wire projecting from a sidewall of the anode plate member. The first anode plate member may have an opening through a central portion. A second anode plate member of a similar design is provided below and adjacent the first anode plate member. A conducting member is provided for electrical communication between the embedded wires. The conducting member may have an end configured to be accessed externally of the capacitor. A first separator sheet is positioned adjacent the lower surface of the first anode plate member, and a second separator sheet is positioned adjacent the upper surface of the second anode plate member. A cathode foil is sandwiched between a first separator and the second separator, and is preferably sealed within portions of the separator sheets. The cathode foil may have a tab extending from the cathode foil. A stack assembly separator covers the stack assembly. A case is provided covering the stack assembly separator and stack assembly and attaches to a cover to enclose the stack assembly within an interior area of the capacitor. The tab of the cathode foil is electrically connected to the case. An electrolyte fluid is disposed within the interior area of the capacitor. A cylindrical passage is provided through a central portion of the capacitor stack, the stack assembly separator and an upper wall of the case. A first tube is provided passing through the cylindrical passage with an insulator tube surrounding the first tube.

A method of forming a capacitor is also provided. The method comprises the steps of: forming a plurality of anode plate members each having an embedded wire, at least one cathode foil, and a plurality of separator sheets, with an opening through the central portion of the anode plate members, cathode foil, and separator sheets; stacking the anode plate members with separator sheets positioned adjacent the anode plate members and the cathode foil sandwiched between the separator sheets to form a capacitor stack; connecting a conducting member to the embedded wires; covering the stack assembly with a stack assembly separator; covering the stack assembly separator and stack assembly with a case; attaching the cathode foil to the case; providing an end of the conducting member externally of the case; connecting the case to a cover to encase the stack assembly and stack assembly separator with an interior area of the capacitor; providing a tube through the openings; and filling the interior area with an electrolyte fluid. The method may further comprise the step of attaching the cover to a base assembly having a first contact pad in contact with the case and a second contact pad in contact with the end of the conducting member.

It is appreciated that a plurality of anode plate members, separators, and cathode foils may be provided in a capacitor according to teachings of the invention.

BRIEF DESCRIPTION OF THE DRAWINGS

A more detailed understanding may be had from the following description, given by way of example in conjunction with the accompanying drawings wherein.

DETAILED DESCRIPTION

Figure 1A:
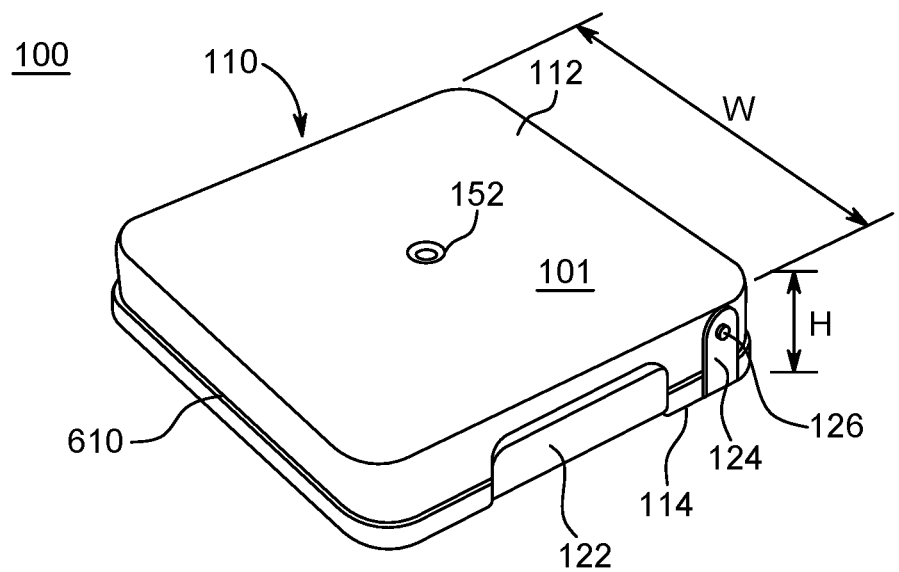
FIG. 1A is a top perspective view of an example of a capacitor according to teachings of the invention.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B, or C, as well as any combination thereof.

FIGS. 1A-2B illustrate an example of a capacitor 100. The capacitor 100 may include a capacitor body 110 that may be coupled to a base 114 via double-sided adhesive tape 160, or another adhesive. As further discussed below, the capacitor body 110 is preferably a self-contained unit housing a plurality of plate members that are stacked with one another and filled with an electrolyte fluid. The capacitor body 110 may be designed as a self-contained unit that may be subsequently coupled to the separate base 114. The base 114 may be specially configured to receive the capacitor body 110. This arrangement may permit the capacitor 100 to be fitted to a number of different bases, or otherwise connected or mounted to different mounting surfaces as necessitated by the application in which the capacitor 100 may be used.

The capacitor 100 may be a low-profile capacitor having a width W and a height H. The width-to-height ratio of the capacitor 100 may preferably be 4:1, which may allow for compact mounting onto a printed circuit board (PCB) or another mounting surface.

The capacitor body 110 preferably includes a case 112 and a cover 610. The case 112 and the cover 610 may be formed of tantalum and/or any other suitable type of conductive material such as a metal. The case 112 and the cover 610 form an interior area configured to house internal components of the capacitor 100. The case 112 and the cover 610 are preferably hermetically welded together to form an enclosure for the capacitor 100. Furthermore, the case 112 may include an opening 152 (i.e., hole) that may be used to hermetically weld a tube 612 (shown in FIGS. 6A-C, and explained in further detail) to the cover 112. The tube 612 may extend between the case 112 and the cover 610 or may contact an indentation in the cover. Although in the present example the opening 152 (hole) may be formed at the center of the case 112, the opening 152 may be formed at an off-center position.

The base 114 may be formed from a plastic supporting body, and may include first contact pads 122 and a second contact pad 124. The first contact pads 122 comprise negative terminals. The first contact pads 122 may be located on opposite sides of the base 114. The second contact pad 124 may be on the same side of the base 114 as one of the first contact pads 122. The first contact pad 122 that may be adjacent to the second contact pad 124 may be disposed in a recess that may be formed on the edge of the base 114. As a result, the first contact pad 122 and the second contact pad 124 may be spaced apart from sidewalls of the case 112 by different distances. The first contact pads 122 may be electrically coupled to the case 112 through electrical connection portions. The second contact pad 124 may be electrically insulated from the case 112 by an insulating material disposed between the second contact pad 124 and the case 112. The second contact pad 124 may be adjacent and electrically coupled to a conducting member 622 at its end portion 702, such as at the position of the seal member 712.

The first contact pads 122 and the second contact pad 124 may connect the capacitor 100 to various types of electronic circuitry. The first contact pads 122 may have a generally right angle or L-shaped cross-section, and may be electrically coupled to the case 112. The second contact pad 124 may also have a generally right angle or L-shaped cross-section, and may be isolated from the case 112. The capacitor 100 may also include connection leads for connecting the base 114 to various types of electronic circuitry.

The connection leads may include a first lead 132 and a second lead 134. The first lead 132 comprises a negative wire, and the second lead 134 comprises a positive wire. The first lead 132 may be electrically coupled to the first contact pads 122, and the second lead 134 may be electrically coupled to the second contact pad 124. The first lead 132 and the second lead 134 may extend outwardly from the base 114 of the capacitor 100 and they may have circular cross-sections. However, alternative implementations are possible in which one or more of the first lead 132 and the second lead 134 have different cross-sections, such as a rectangular cross-section. Although the first lead 132 and the second lead 134 are shown to have different thicknesses, alternative implementations are possible in which the first lead 132 and the second lead 134 have the same thickness.

The base 114 may further include one or more threaded studs 142 that extend outwardly from the base 114. The threaded studs 142 are affixed to nuts embedded in the plastic body of the base 114. The one or more threaded studs 142 may be used to affix the capacitor 100 to a PCB or other mounting surface in a well-known fashion. In the present example, the one or more threaded studs 142 are situated on opposite sides of the second lead 134 and have the same length. However, alternative implementations are possible in which the one or more threaded studs 142 are situated at different locations along the base 114 and/or have a different lengths.

The first lead 132 and the second lead 134 may also be situated at different locations on the base 114. The present disclosure is not limited to any location, shape, material, and physical dimensions for the first contact pads 122, the second contact pad 124, the lead 132, the second lead 134, and the one or more threaded studs 142. Furthermore, in some implementations, the first lead 132 and the second lead 134 may be omitted to facilitate the stacking of the capacitor 100 over other capacitors.

Figure 3A:
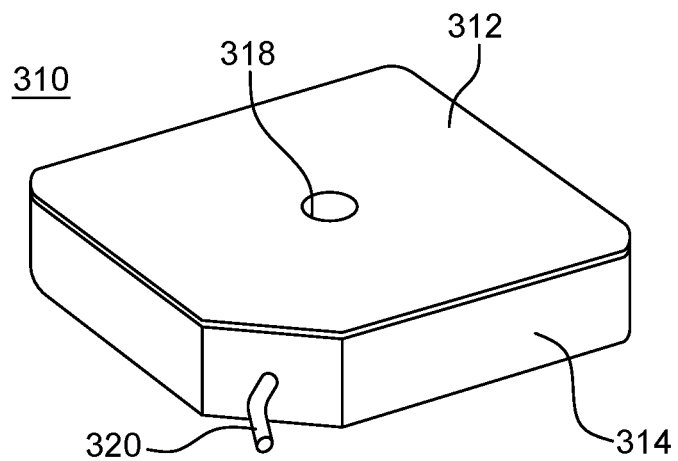
FIG. 3A shows a top perspective view of an example of an anode plate member according to teachings of the invention.
Figure 3B:
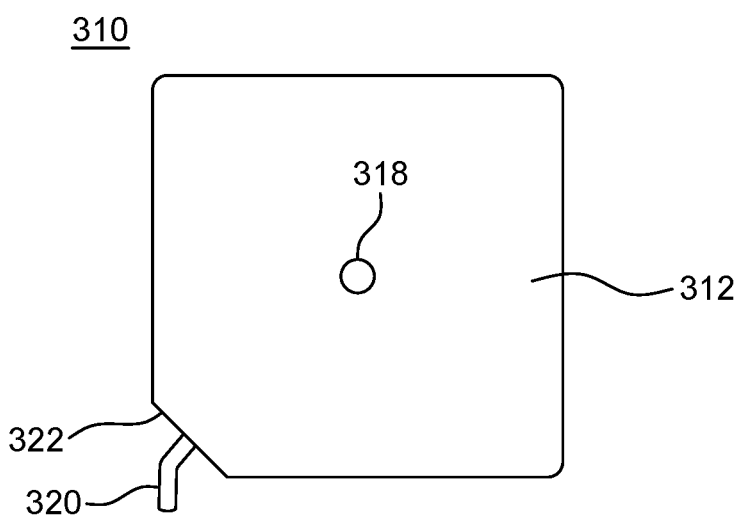
FIG. 3B shows a top view of the anode plate member.
Figure 3C:
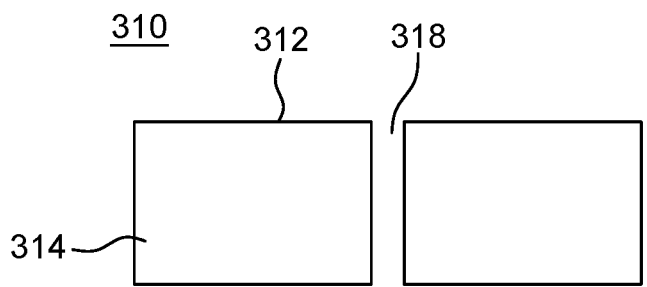
FIG. 3C shows a cross-sectional side view of the anode plate member.
Figure 4:
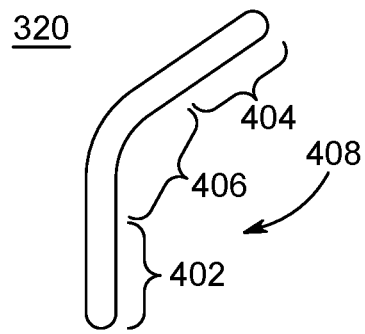
FIG. 4 shows an example of a conducting member that is embedded in the anode plate member.

Various internal components of a capacitor 100 according to aspects of the invention are now described in further detail. FIGS. 3A-4 show examples of an anode plate member 310. The anode plate member 310 may include a main portion 312 and sidewalls 314 around its perimeter. The main portion 312 may have a rectangular cross-section with a cutout corner 322. The anode plate member 310 may be formed using sintered tantalum powder. An anode of sintered tantalum powder is sometimes referred to in the relevant art as an anode "pellet" or "slug." An oxide layer may form over the surface of the anode plate member 310 to function as an anode of the capacitor 100. A dielectric layer may be formed on the anode plate member 310 by an anodization process, whereby anodic oxidation of the anode material may form an oxide layer over the surface of the anode plate member 310.

The main portion 312 may include an opening 318 (i.e., hole) that may be formed in its central area. The opening 318 may extend completely through a height of the main portion 312. A conducting member 320, which may be referred to as a wire or embedded wire, is preferably embedded in the main portion 312 and may extend outwardly from one of the sidewalls 314. Although the opening 318 is shown in the central area of the main portion 312, alternative implementations are possible in which the opening 318 may be formed at an off-center position.

As shown, the main portion 312 may be shaped as a square or rectangle having a cutout or angled corner 322. However, alternative implementations are possible in which the main portion 312 may have another shape, such as a rectangular shape or a circular shape. The anode plate member 310 may be pressed tantalum powder encasing a portion of the conducting member 320.

The conducting member 320 may include a first portion 402 that may be coupled to a second portion 404 via a bent portion 406. The conducting member 320 may have a bent or concave side 408, which may be arranged to contact and/or cradle a conducting member 622 (shown in FIGS. 7 and 10-12) when the conducting member 320 is coupled with the conducting member 622.

The conducting member 320 may be formed by bending a wire in the shape shown in FIG. 4. A first end of the wire may be embedded in the anode plate member 310, while a second end may extend outwardly from the sidewalls 314. As illustrated, the conducting member 320 may extend outwardly from a portion of the sidewall that may be situated at the cutout corner 322. However, alternative implementations are possible in which the conducting member 320 extends from another portion of the sidewalls 314. The conducting member 320 may be formed of any suitable type of material, such as tantalum, niobium, and titanium, or a suitable conductive metal. Although the conducting member is shown with a circular cross-section, alternative implementations are possible in which the conducting member 320 may have another type of cross-section, such as a rectangular cross-section.

Figure 5A:
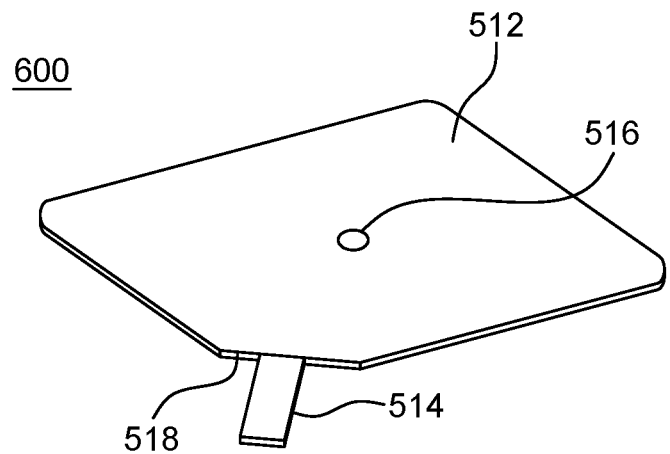
FIG. 5A shows a top perspective view of an example of another plate member that may be part of the capacitor.
Figure 5B:
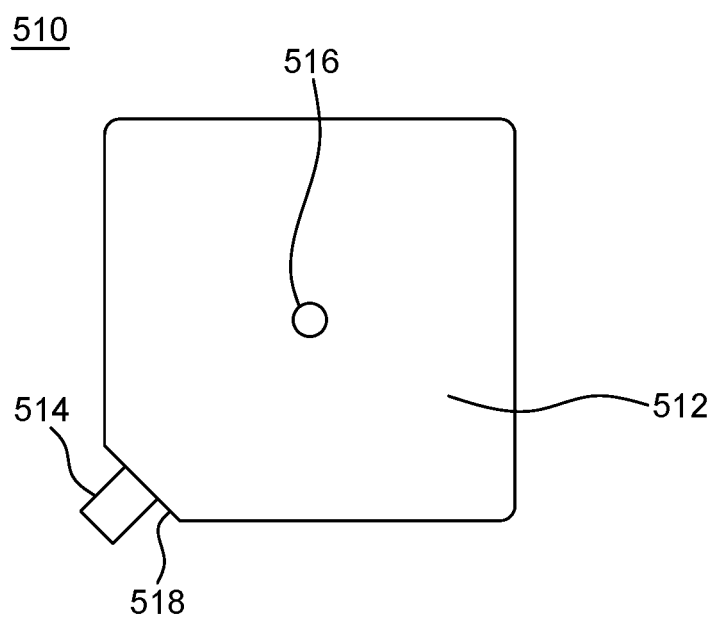
FIG. 5B shows a top view of the another plate member.

FIGS. 5A-B show examples of a cathode foil 510. The cathode foil 510 may be made of a metal or coated metal, such as a tantalum foil coated with palladium (Pd). However, alternative implementations are possible in which the cathode foil 510 may be formed of another suitable material such as platinum, rhodium, or their oxides or carbon or any other cathode material.

The cathode foil 510 may include a main portion 512 and a tab 514 that may be coupled to the main portion 512. The main portion 512 may include an opening 516 (i.e., hole) that may be formed in the center of the main portion 512. The tab 514 may be oriented at an angle relative to the main portion 512. Although the tab 514 is shown to be integral with the main portion 512, alternative implementations are possible in which the tab 514 may be formed separately of the main portion 512. In such instances, the tab 514 may be welded to the main portion 512. The main portion 512 may be shaped as a square having a cutout corner 518. However, alternative implementations are possible in which the main portion 512 may have another shape, such as a rectangular shape or a circular shape. Although the tab 514 is shown to extend from the cut-out corner 518, alternative implementations are possible in which the tab 514 may extend from another portion of the cathode foil 510.

Surfaces of the cathode foil 510 and portions of the inner surface of the case 112 may form various cathode layers. The cathode foil 510 and portions of the inner surface of the case 112 may include sintered tantalum, as described in U.S. Pat. No. 9,947,479 and U.S. Published Patent Application No. 2017/0207031 A1, the entire contents of each of which are incorporated by reference herein. The cathode foil 510 and portions of the inner surface of the case 112 may include electrophoretically deposited tantalum, as described in U.S. Pat. No. 9,070,512, the entire contents of which is incorporated by reference herein.

Figure 6A:
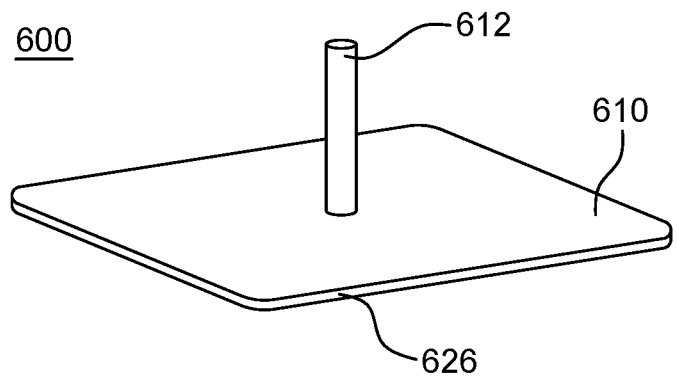
FIG. 6A shows a top perspective view of an example of a support member.
Figure 6B:
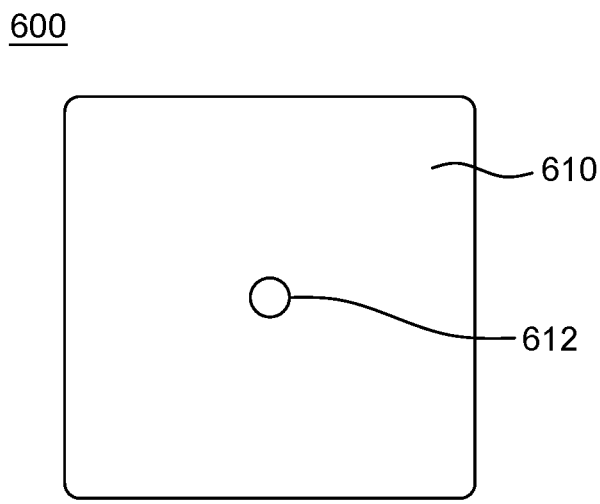
FIG. 6B shows a top view of the support member.
Figure 6C:
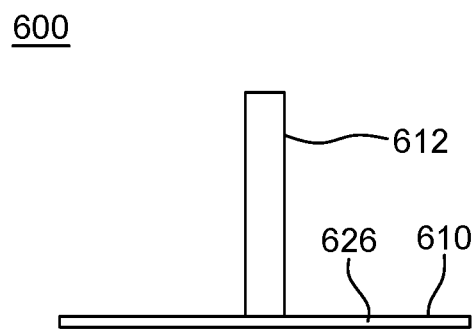
FIG. 6C shows a side view of the support member.

FIGS. 6A-C show examples of a cover assembly 600. The cover assembly 600 may comprise a conductive metal such as tantalum and/or another suitable material, such as niobium, titanium, or alloys of those. The cover assembly 600 may include the tube 612 and the cover 610. The tube 612 may extend outwardly from the cover 610 and may include a hollow passage within. Although the tube 612 is shown to have a circular cross-section, alternative implementations are possible in which the tube 612 may have another shape, such as a rectangular or square cross-section. The tube 612 may be formed separately from the cover 610 and welded to the cover 610. However, alternative implementations are possible in which the tube 612 may be integral with the cover 610 or otherwise formed as a unitary piece. Although the tube 612 is shown in the center of the cover 610, alternative implementations are possible in which the tube 612 may be located at an off-center position. The upper portion of the tube 612 may formed so as to fit in an opening in the cover.

Figure 1B:
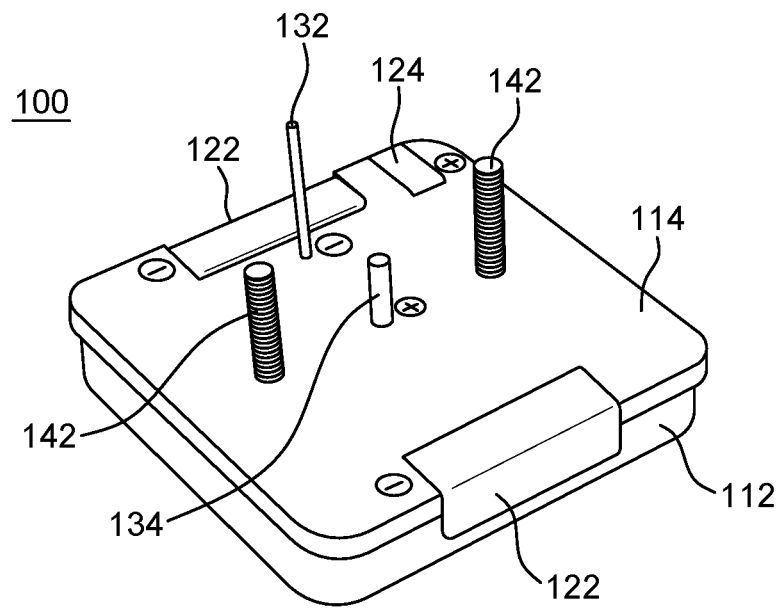
FIG. 1B shows a bottom perspective view of the capacitor of FIG. 1A.
Figure 1C:
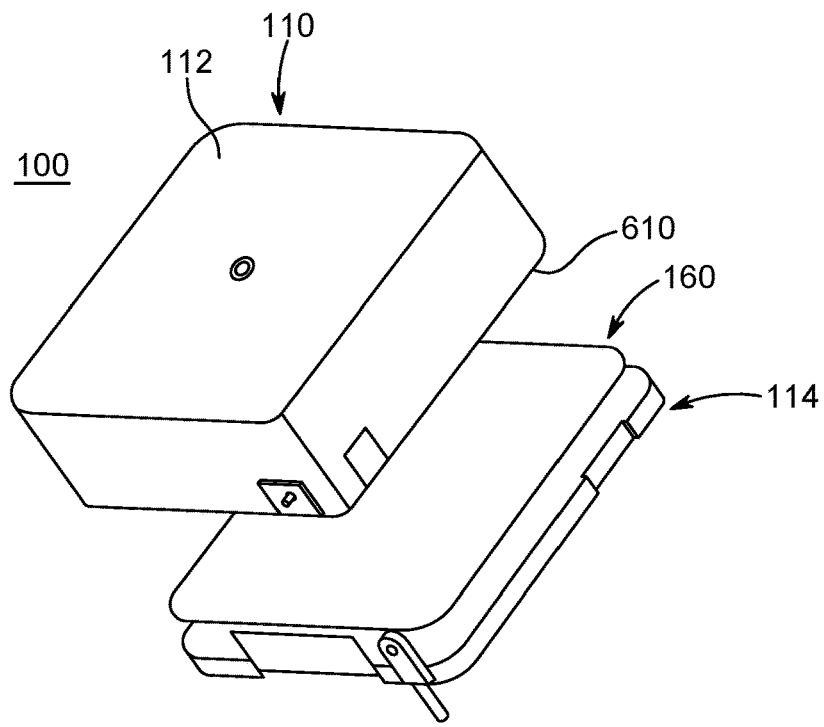
FIG. 1C shows a top perspective exploded view of a capacitor according to teachings of the invention.
Figure 1D:
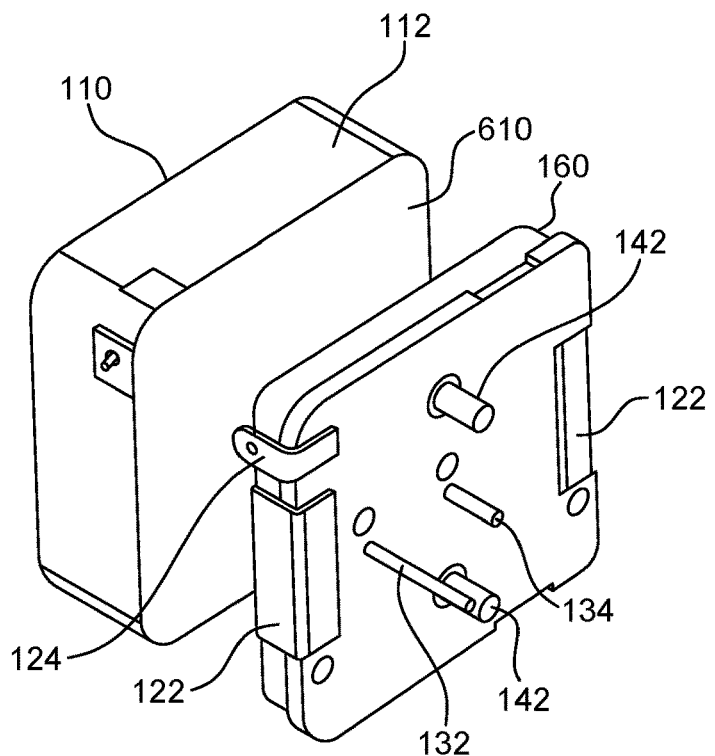
FIG. 1D is bottom perspective exploded view of the capacitor of FIG. 1C.
Figure 2A:
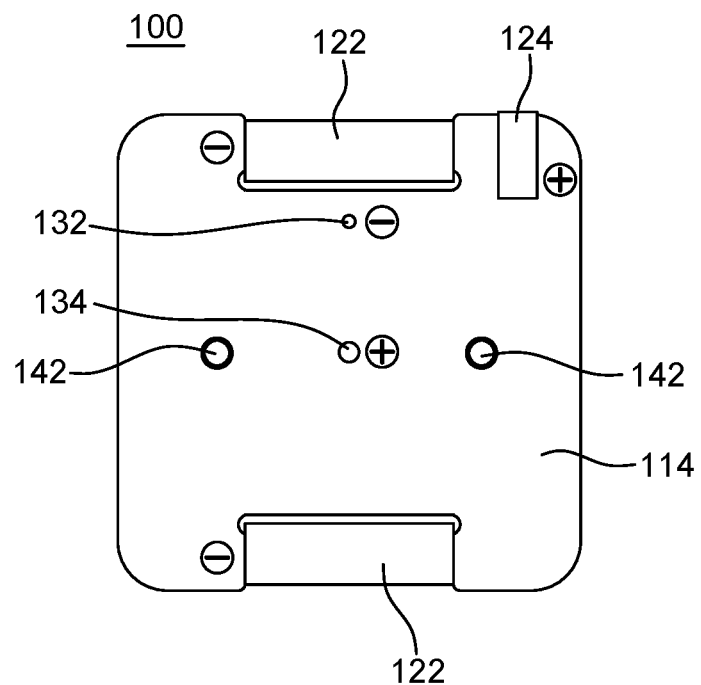
FIG. 2A shows a bottom view of the capacitor of FIG. 1C.
Figure 2B:
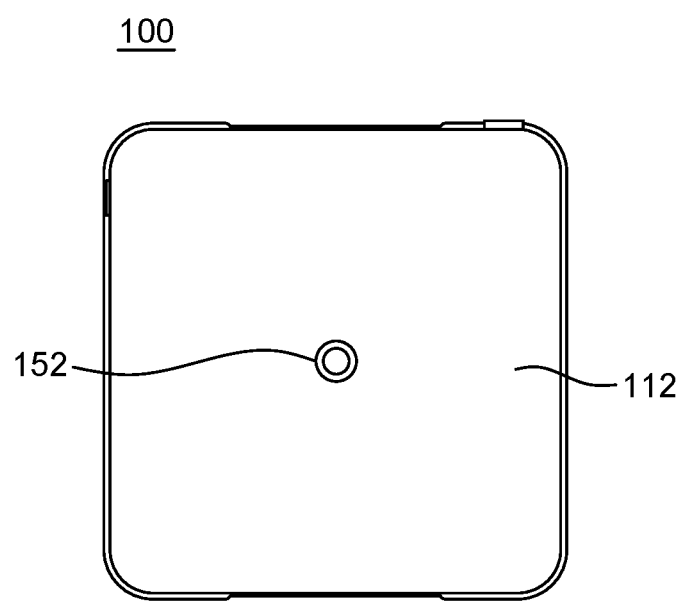
FIG. 2B shows a top view of the capacitor of FIG. 1C.

FIGS. 7A-7D show examples of a conducting member 622 that may be used to couple one or more anode plate members 310 (FIGS. 3A-3C) to the second contact pad 124 (FIGS. 1A-1B).

An end portion 702 of the conducting member 622 may be accessible to an external portion of the capacitor 100, possible through a seal. The end portion 702 may be generally straight and may be coupled to a generally straight portion 704 via a first bent portion 706. The generally straight portion 704 may be coupled to a straight portion 708 via a second bent portion 710. The conducting member 622 may include a wire that may be bent to achieve the shape depicted in FIGS. 7A-D. Although the conducting member 622 is shown to have a circular cross-section, alternative implementations are possible in which the conducting member 622 may have another cross-section, such as a rectangular cross-section.

Figure 7A:
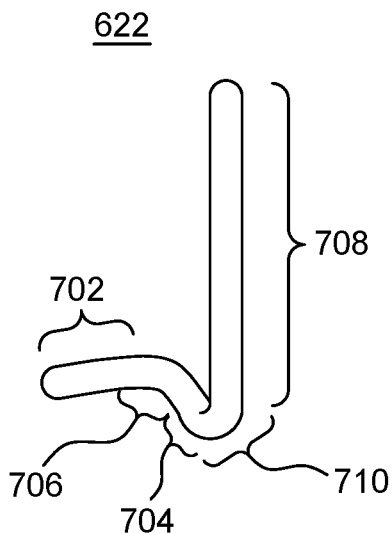
FIG. 7A shows a perspective side view of an example of a conducting member that is part of the capacitor.
Figure 7B:
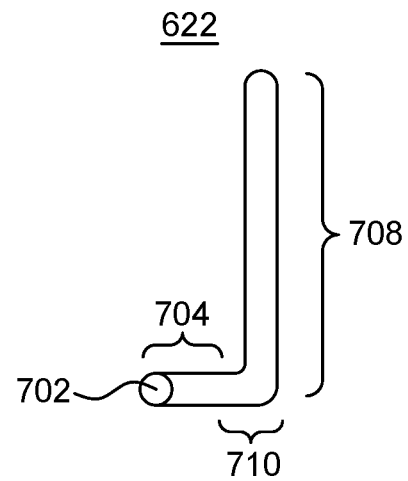
FIG. 7B shows a side view of the conducting member.
Figure 7C:
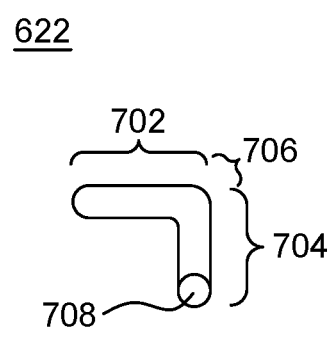
FIG. 7C shows a top view of the conducting member.
Figure 7D:
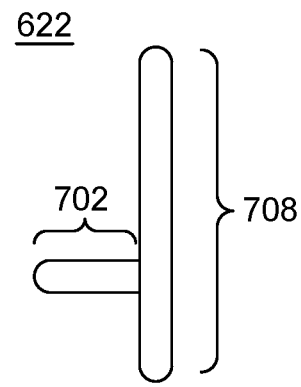
FIG. 7D shows another planar side view of the conducting member.
Figure 7E:
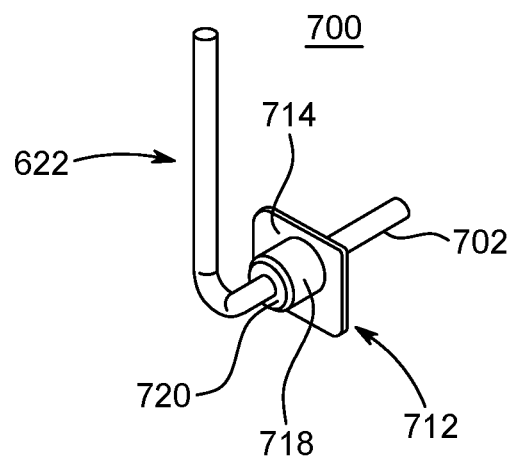
FIG. 7E shows a perspective of an example of a seal assembly.
Figure 7F:
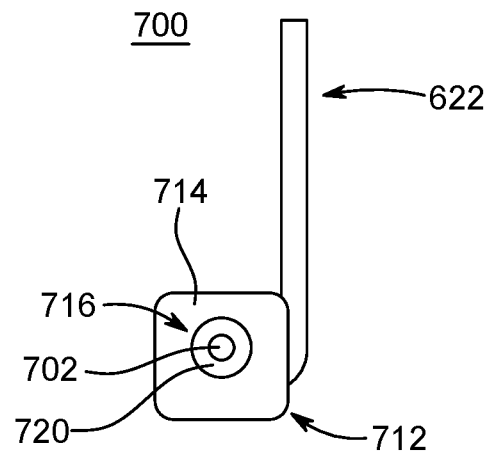
FIG. 7F shows a front view the seal assembly.
Figure 7G:
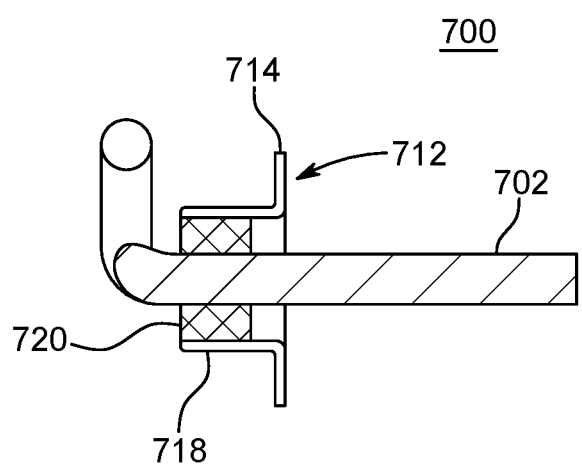
FIG. 7G shows a cross-section view the seal assembly of FIG. 7E.

FIGS. 7E-7G show examples of a seal assembly 700 of a portion of the case 112 which may include the conducting member 622 and a seal member 712. The seal member 712 is preferably a glass-to-metal seal (GTMS) and may include a plate member 714 having an opening 716 and a tube portion 718. The tube portion 718 may include an interior hollow passage. The end portion 702 of the conducting member 622 may be disposed inside the hollow passage. The hollow passage of the tube portion 718 may be at least partially aligned with the opening 716 of the plate member 714 to permit the end portion 702 to pass through the seal member 712. The remaining space inside the tube portion 718 may be filled with an insulator, such as a glass sealant, to form a hermetic seal 720. The glass sealant may be arranged to surround the end portion 702 and electrically insulate the conducting member 622 from the seal member 712.

Although the tube portion 718 is shown to have a circular cross-section, alternative implementations are possible in which the tube portion 718 may have another shape of cross-section, such as a rectangular cross section.

Figure 8A:
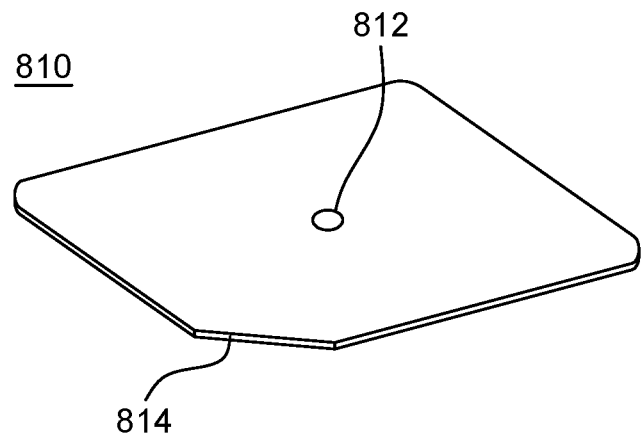
FIG. 8A shows a top perspective view of an example of a separator sheet that is part of the capacitor.
Figure 8B:
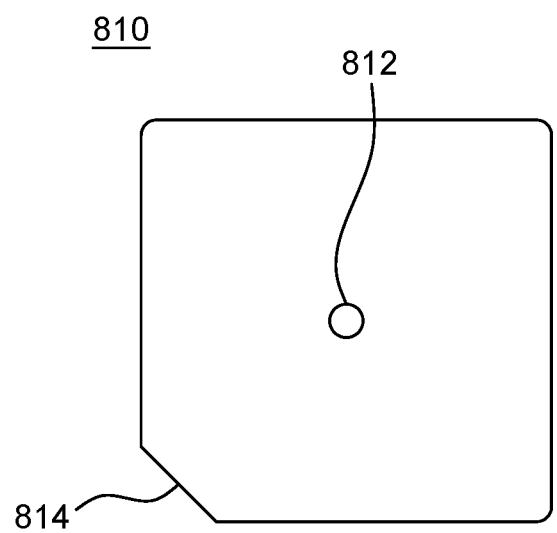
FIG. 8B is top view of the separator sheet.

FIGS. 8A-B show examples of a separator sheet 810. The separated sheet 810 may have an opening 812 through its central portion. The separator sheet 810 may be formed of polytetrafluoroethylene (PTFE) or another non-conductive and/or insulative material permeable by electrolyte. The separator sheet separates and may insulate the cathode foils 510 from the anode plate members 310 or from other components of the capacitor. The separator sheet 810 may be shaped generally as a square with a cut out corner 814 and may include an opening 812 formed in the center of the separator. Although the opening 812 is shown to have a circular shape, alternative implementations are possible in which the opening 812 may have another shape, such as a rectangular shape. Furthermore, alternative implementations are possible in which the separator sheet 810 may have another shape, such as a rectangular shape or an oval shape. The separator sheet 810 may be configured to prevent a short circuit between anode plate member 310 and a cathode foil 510 that may be disposed on opposite sides of the separator sheet 810. The separator sheets 810 are preferably positioned between a surface of anode plate members 310 adjacent to and facing a surface of a cathode foil 810 as shown in FIG. 9.

Figure 9:
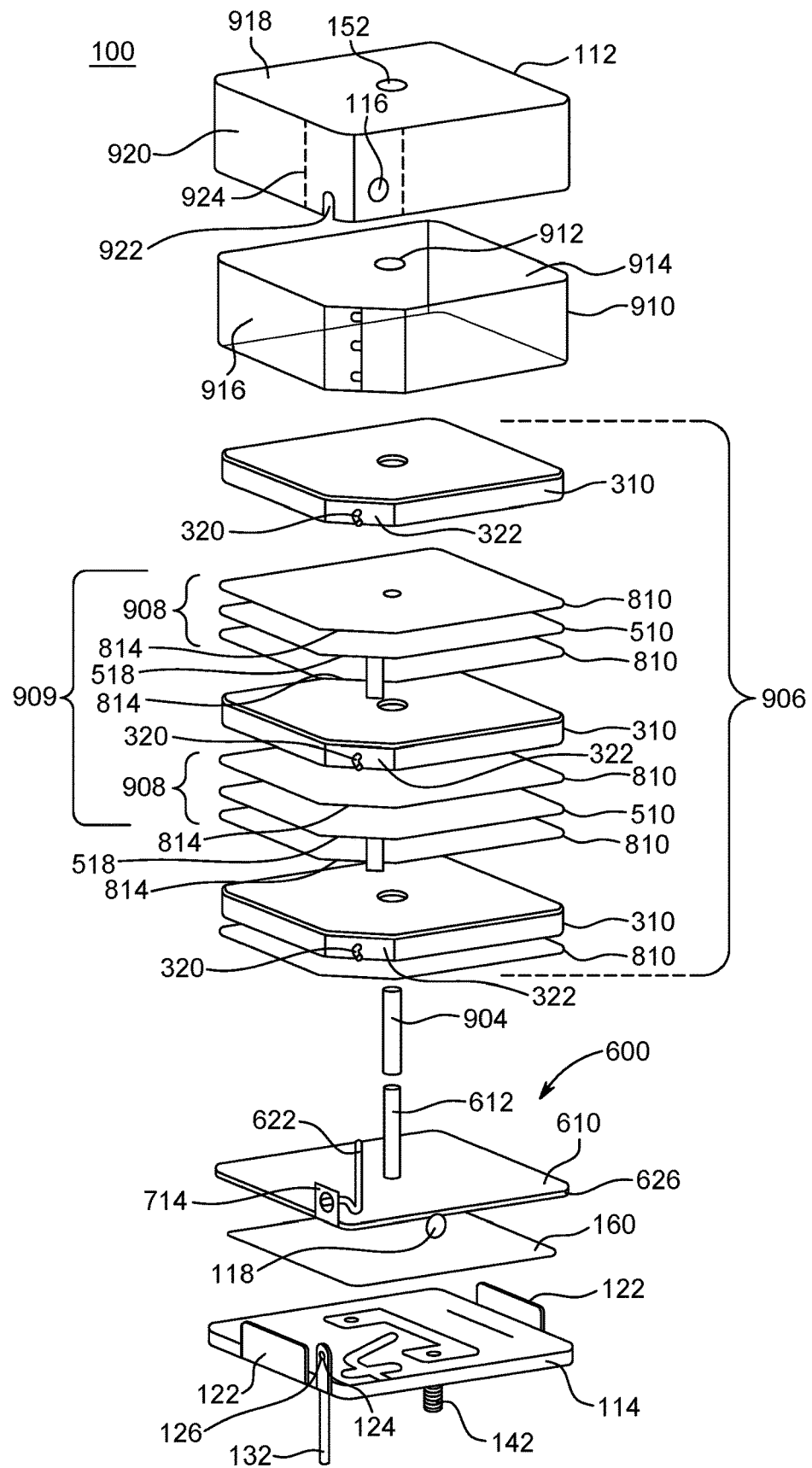
FIG. 9 shows an exploded perspective view of a capacitor according to teachings of the invention.

FIG. 9 is an exploded view of the capacitor 100 illustrating how elements described above are assembled. As shown in FIG. 9, a capacitor element 909 is denoted as a combination of an anode plate members 310 having cathode foils 510 positioned above and below the anode plate members 310, with separator sheets 810 between the facing surfaces of the cathode foils 510 and the anode plate members 310. When assembled, the openings in the anode plate member 310, cathode foils 510, and separator sheets 810 align to form a passage through the capacitor element 909.

As shown in FIG. 9, one or more capacitor elements 909, including an anode plate members 310, cathode foils 510, and separator sheets 810, may be in a stacked arrangement referred to as a stack assembly 906. The stack assembly 906 is essentially a stack of capacitor elements 909 or potions of capacitor elements 909, with separator sheets 810 arranged as needed between surfaces of the anode plate members 310 and cathode foils 510.

When assembled, the openings in the anode plate members 310, cathode foils 510, and separator sheets 810 align to form a passage P through the stack assembly 906. The tube 612 and an insulator tube 904 are positioned through the aligned openings in the stack assembly 906 forming the passage. The tube 612 is connected to the case and cover. The insulator tube 904 insulates the tube 612 from the anode plate members and cathode foils.

Figure 11:
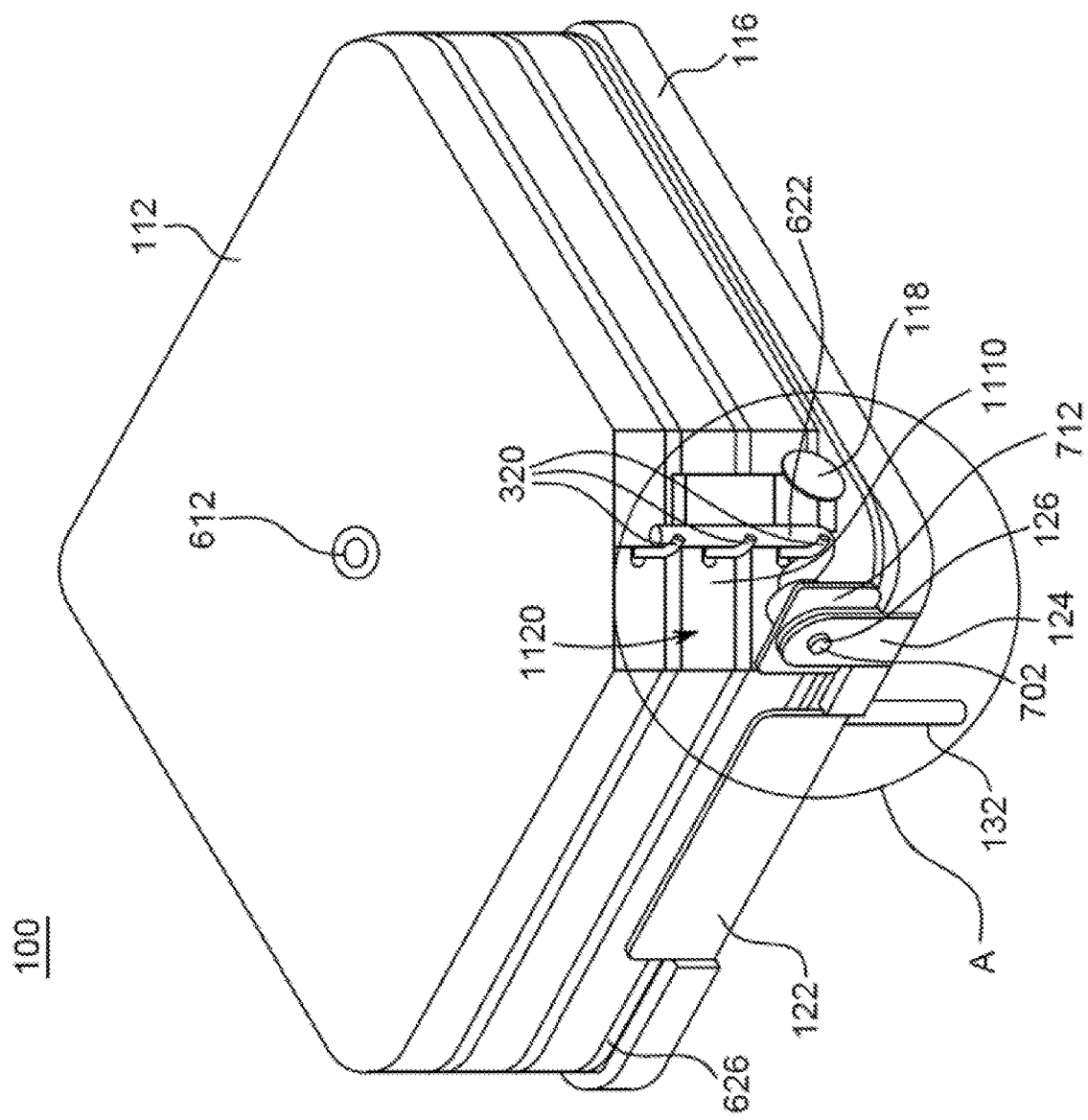
FIG. 11 shows a top perspective view of a capacitor according to the invention with its case removed.

The stack assembly 906 is preferably disposed over the cover assembly 600. The stack assembly 906 may include one or more of the following: a first anode plate member 310, a first separator sheet 810, a cathode foil 510, and a second separator sheet 810. A second anode plate member 310 may be adjacent to the second separator sheet 810. The cathode foil 510 may be sandwiched between two separator sheets 810 to form a cathode foil assembly 908. In each cathode foil assembly 908, the cut-out corners 518 of the cathode foils 510 may be aligned with the cut-out corners 814 of the separator sheets 810, such that the cut-out corners 814 and 518 are situated above or below one another (e.g., directly above or below one another) and form a shared edge or end face 1110, as shown in FIG. 11 and discussed in further detail below. Each cathode foil assembly 908 may be disposed between anode plate members 310 to form the stack assembly 906.

The openings through the anode plate members 310, the cathode foils 510, the separator sheets 810, and the case 112 preferably form a passage through a central portion of the capacitor. The passage may be generally cylindrical, or may have a different shape if the openings have a shape other than rounded. The passage is configured to receive the tube 612 and insulator tube 904, as described in more detail below.

Figure 10:
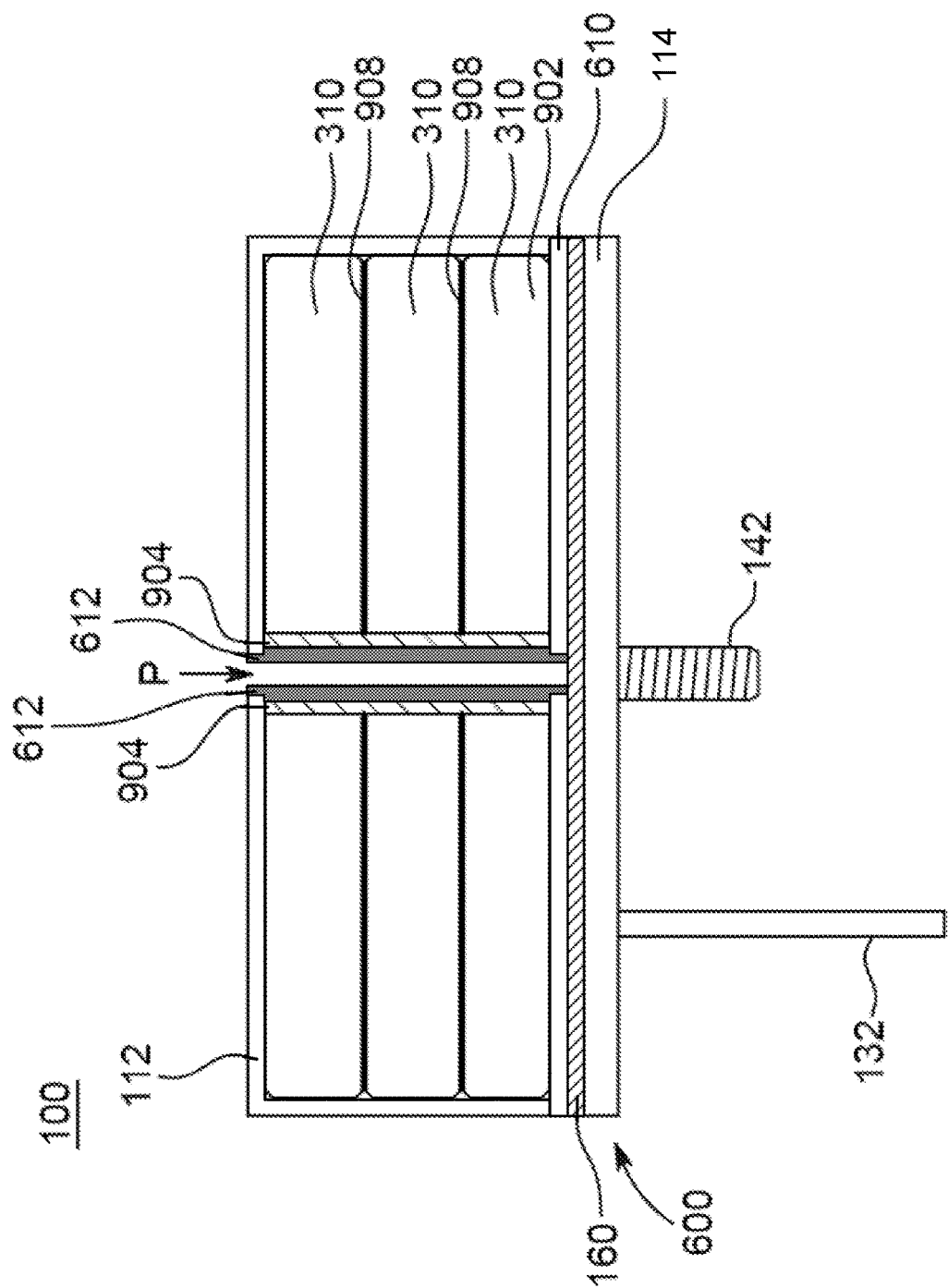
FIG. 10 shows a cross-sectional side view of an assembled capacitor according to teachings of the invention.

FIG. 10 shows a cross section of the capacitor 100 illustrating how elements described above are assembled. When the stack assembly 906 is placed over the cover assembly 600, the tube 612 and the insulator tube 904 extend through the respective aligned openings in the anode plate members 310, the cathode foils 510, and the separator sheets 810. The insulator tube 904, which is placed over the tube 612 of the cover assembly 600, prevents the tube 162 from electrically contacting the anode plate members 310 and cathode foils 510, or otherwise causing a short circuit between the anode plate members 310 and cathode foils 510. The tube 612 may have a step in it at each end (i.e., a smaller outer diameter) to create a circular shiplap-type joint. The shiplap-type joint may allow for easier welding of the tube 612 to the case 112 and the cover 610.

Although FIG. 10 shows the stack assembly 906 may include three anode plate members 310, alternative implementations are possible in which the stack assembly 906 may include any number of anode plate members 310. Although FIG. 10 shows the stack assembly 906 may include two cathode foils 510, alternative implementations are possible in which the stack assembly 906 may include any number of cathode foils 510. Although FIG. 10 shows the stack assembly 906 may include fewer cathode foils 510 than anode plate members 310, alternative implementations are possible in which the stack assembly 906 may include a greater number of cathode foils 510 than anode plate members 310.

FIG. 11 shows a perspective view from above of the capacitor 100 with the case 112 removed. As illustrated in FIGS. 9 and 11, considering the stack assembly 906, the cut-out or angled corners 518 of the cathode foils 510 may be aligned with the cut-out or angled corners 814 of the separator sheets 810 and the cutout or angled corners 322 of the anode plate members 310, such that the cutout corners 322, 518, and 814 are situated above or below one another (e.g., directly above one another) forming a shared edge, end surface or end face 1110. When the stack assembly 906 is assembled, the cutout corners 322, 518, and 814 may at least in part define an angled sidewall or angled face 1110 of the stack assembly 906. The angled sidewall 1110 may have a width less than the width of the sides of the anode plate member 310.

A stack assembly separator 910 may be placed over the stack assembly 906. The stack assembly separator 910 may be formed of polytetrafluoroethylene (PTFE) or some other non-conductive material that is permeable by an electrolyte. The stack assembly separator 910 may have a shape that is the same, similar to, or complementary to the shape of the stack assembly 906 and/or the case 112 and fits inside the case 112. Sidewalls 916 of the stack assembly separator 910 may have a height allowing the sidewalls 916 to entirely cover the sides of the stack assembly 906 to prevent the case 112 from short-circuiting the stack assembly 906. The stack assembly separator 910 may include an opening 912 that may be situated in the center of a top surface 914 of the stack assembly separator 910. Although the opening 912 is shown to have a circular shape, alternative implementations are possible in which the opening may have another shape, such as a rectangular shape. Although the opening 912 is shown in the center of the top surface 914, alternative implementations are possible in which the opening 912 may be located in an off-center position.

The case 112 is placed over the stack assembly separator 910 and the stack assembly 906. The case 112 may include a top surface 918 and sidewalls 920. An opening 922 may be formed in a portion 924 of the sidewalls 920. The plate member 714 may be welded to the case 112 at the opening 922, which may close the opening 922. A fill port 116 may be formed on a side of the case 112 for introducing a fluid electrolyte into the interior of the capacitor 100. As is known in the art of electrolytic capacitors, the fluid electrolyte and case may act as part of the cathode of the capacitor. The fill port 116 may be sealed using a plug which may be welded in place. The plug may be formed from a metal, such as, for example, tantalum, titanium or niobium. The fill port 116 may also formed in the portion 924 of the sidewalls 920.

When the capacitor 100 is assembled, the portion 924 of the case 112 and the angled sidewall 1110 of the stack assembly 906 may define a cavity 1120 providing space within the interior area of the capacitor 100. In the cavity 1120, electrical connections may be positioned and formed between the stack assembly 906 and the capacitor's terminals (e.g., the contact pads 122-124 and/or the leads 132-134). Because the fill port 116 may also be formed in the portion 924 of the sidewalls 920 of the case 112, a fluid electrolyte may be delivered directly into the cavity 1120 from where it can disperse within the interior area of the capacitor. In some implementations, dispensing the fluid in another portion of the capacitor may not be practical due to a tight fit between the case 112 and the rest of the capacitor's 100 components. Furthermore, when the case 112 is placed over the stack assembly separator 910, the opening 912 of the stack assembly separator 910 may be aligned with the opening 152 of the case 112 to permit the edges of the opening 152 to be welded to the top of the tube 612.

Figure 12:
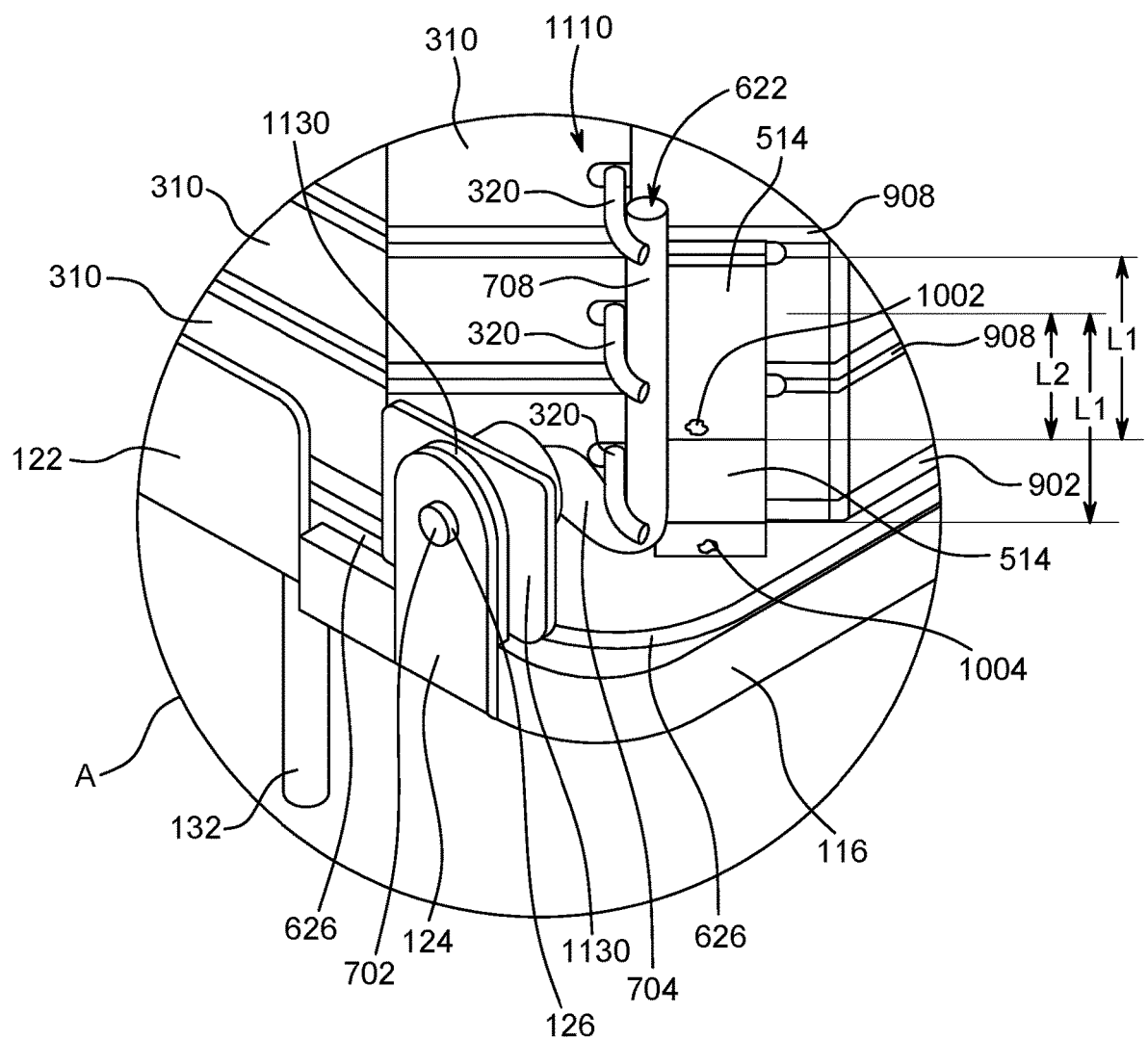
FIG. 12 shows an enlarged view of a portion of FIG. 11.

FIG. 12 is an enlarged view of portion A identified in FIG. 11. The tabs 514 of the cathode foils 510 may be arranged in a cascading, overlapping arrangement. Each of the tabs 514 may have a length L1, and they may partially overlap with one another. The respective portions of the tabs 514 that are overlapped may have a length L2 that may be less than the length L1. At least some of the tabs 514 may extend over the sidewalls 314 of the anode plate members 310. In this regard, an electrical insulation may be provided between the tabs 514 and the sidewalls 314 of the anode plate members 310, for example, to prevent the occurrence of a short circuit between any of the anode plate members 310 and one or more of the cathode foils 510. Although FIG. 12 shows that the tabs partially overlap with one another, alternative implementations are possible in which at least one tab 514 may be fully or more fully overlapped with another tab 514. In such instances, the two tabs 514 may have different lengths.

The tabs 514 may be electrically coupled to one another and at least one of the tabs 514 may be electrically coupled to the cover 610 of the cover assembly 600. When the cover assembly 600 and case 112 are connected, the case 112 may form part of the cathode of the capacitor 100. The tabs 514 may be in direct contact or directly coupled with one another. One of the tabs 514 may be in direct contact with or directly coupled the cover 610 of the cover assembly 600. The tabs 514 may be spot welded to one another via a weld 1002 and one of the tabs 514, generally the lowest, may be spot welded to the cover 610 of the cover assembly 600 via a weld 1004. It may be appreciated that the description of elements in contact with or directly coupled does not preclude the presence of solder or some other form of adhesive or attachment element between the elements that are described as in direct contact or directly coupled.

The second contact pad 124 may be electrically coupled to the conducting member 320 of each of the anode plate members 310 via the conducting member 622. More particularly, the end portion 702 of the conducting member 622 may extend through the GTMS seal member 712 to be inserted in the hole 126 in the second contact pad 124, after which the end portion 702 may be welded to the second contact pad 124. An insulator 1130 may be located between the second contact pad 124 and the seal member 712. The straight portion 708 of the conducting member 622 may be spot-welded to the conducting members 320 of the anode plate members 310, thereby completing an electrical path between the anode plate members 310 and the second contact pad 124.

When the case 112 and cover 610 are connected to enclose the stack assembly 906 and other internal components of the capacitor 100, the capacitor may be considered a capacitor assembly, and comprises a completely functioning capacitor unit.

Figure 13A:
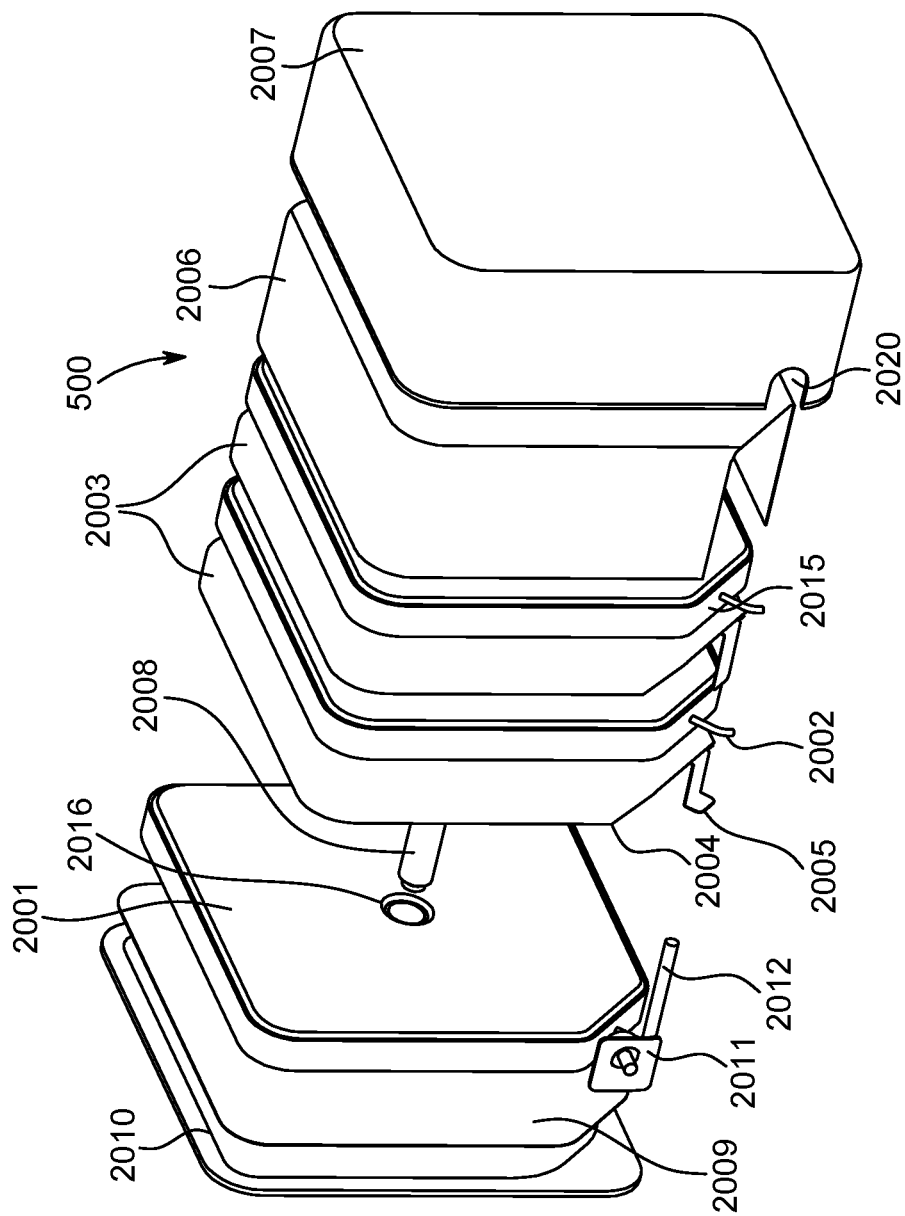
FIG. 13A shows an exploded side perspective view of a capacitor according to teachings of the invention.
Figure 13B:
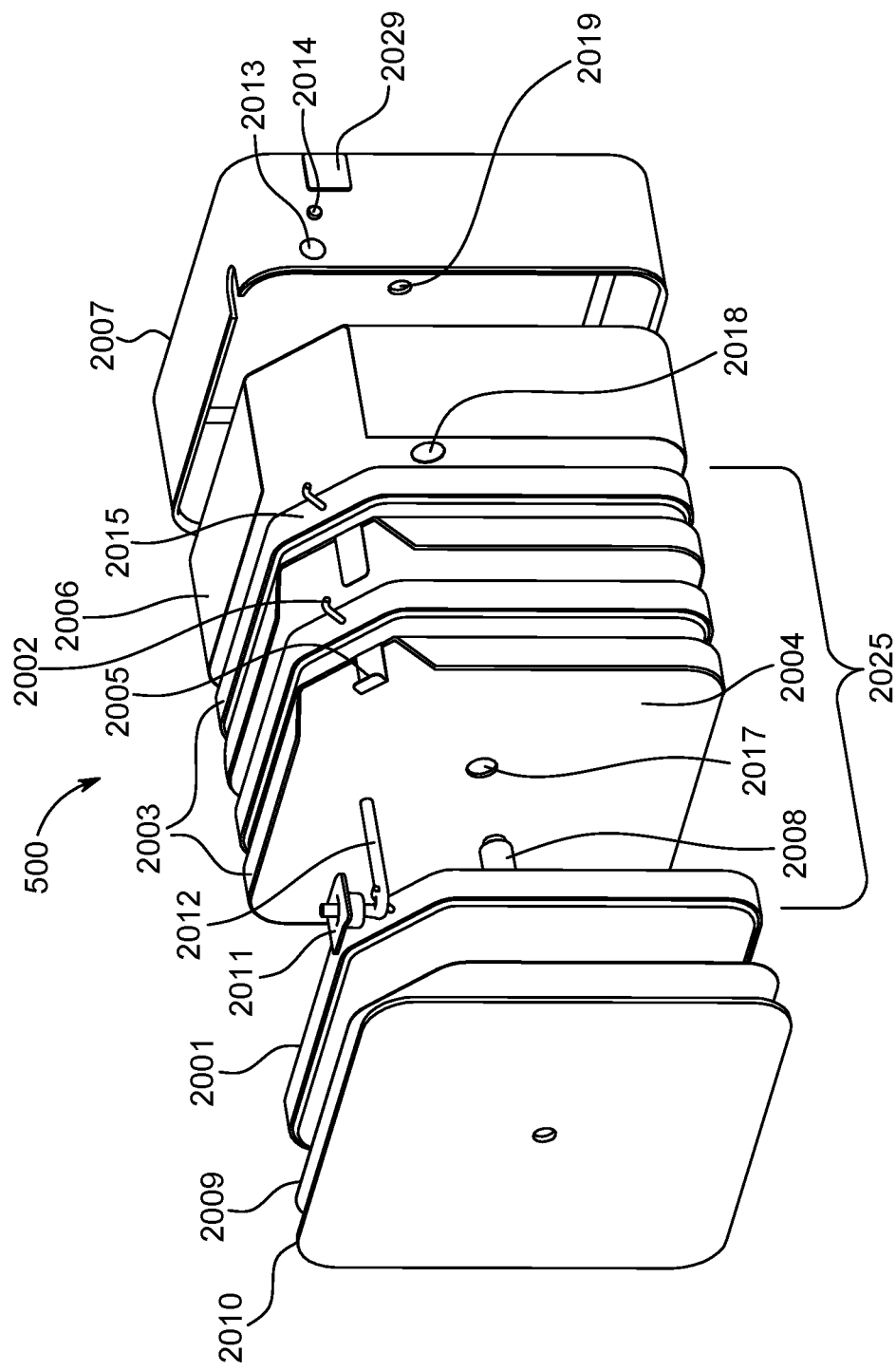
FIG. 13B shows a different exploded side perspective view of the capacitor of FIG. 13A.

FIGS. 13A and 13B show a capacitor 500 according to aspects of the invention. A plurality of anode plate members 2001 are provided. The anode plate members 2001 are formed by pressing tantalum powder into the appropriate shape, include a cut-out or angled corner 2015 and having an opening 2016 through a central portion. A wire 2002 is embedded in each anode plate members 2001 during the pressing process. The anode plate member 2001 is sintered in a vacuum at high temperature. An anodization process is performed in order to form an amorphous dielectric layer. An anode assembly is formed by welding a plurality of anode plate members 2001 to a conductive member 2012. An end of the conductive member 2012 is passed through a GTMS seal 2011 as previously described.

A cathode foil 2004 is heat sealed between two separator sheets 2003. The separator sheets 2003 are sized so as to be larger than the cathode foil. Outer perimeter edges of the separator sheets 2003 extend beyond edges of cathode foil 2004. The outer perimeter edges of the separator sheets 2003 fold over and at least partially cover the outer perimeter sidewalls of the anode plate members 2001. The cathode foil 2004 is preferably formed by stamping from a tantalum foil and applying a palladium cathode layer thereto. A cathode tab 2005 is connected to and extends from a cut-out or angled corner of each cathode foil 2004. Openings 2017 of the cathode foils 2004 and separator sheets 2003 are aligned.

A cathode assembly is formed by spot welding a plurality of cathode tabs 2005 to each other, and then welding one of the cathode tabs to the cover 2010.

A stack assembly 2025, analogous to the stack assembly 906, is formed by combining anode assemblies and cathode assemblies such that the cathode foils 2004 are inserted or interleaved between anode plate members 2001. The cut-out or angled corners are aligned to form an angled surface. A top separator 2006 is provided covering a top and sides of the stack assembly 2025, and a bottom separator 2009 is provided at the bottom or opposite end of the stack assembly 2025. The top separator 2006 has an opening positioned adjacent the angled surface.

A tube assembly 2008, comprising an inner metal or conductive tube covered by an outer insulating tube is positioned through the passage in the stack assembly 2025 formed by the openings 2016, 2017. The inner conducting tube is preferably welded to a portion of the cover 2010 and a portion of a case 2007.

The case 2007 is welded to the cover 2010 to enclose the stack assembly 2025, the conductive member 2012, the top separator 2006, and the bottom separator 2009, within an interior area of the capacitor 500. An electrolyte fluid is introduced into the fill port 2013. The fill port 2013 is sealed via the fill port plug 2014, which is welded shut such as by a fill port cover 2029.

When the case 2007 and cover 2010 are connected to enclose the stack assembly 2025 and other internal components of the capacitor 500, the capacitor 500 may be considered a capacitor assembly, and is a completely functioning capacitor unit.

The capacitor 500 may be attached to a base for mounting, as previously described. To assemble a capacitor of the invention with the base 114, an insulator sheet is placed on an inner surface of the positive terminal 124. An adhesive such as a double sided tape 160 is placed onto the inner surface of the base 114 facing the capacitor 500. The capacitor 500 is positioned over the base 114 while inserting positive connector end 702 into the hole 126 of the positive terminal 124. The edges of the capacitor 500 are aligned with the edges of the base 114. The connector end 702 is welded to the positive terminal 124. Opposite edges of the case 112 are welded to the negative terminals 122. The combined capacitor and base assembly can now be mounted as desired.

Figure 14:
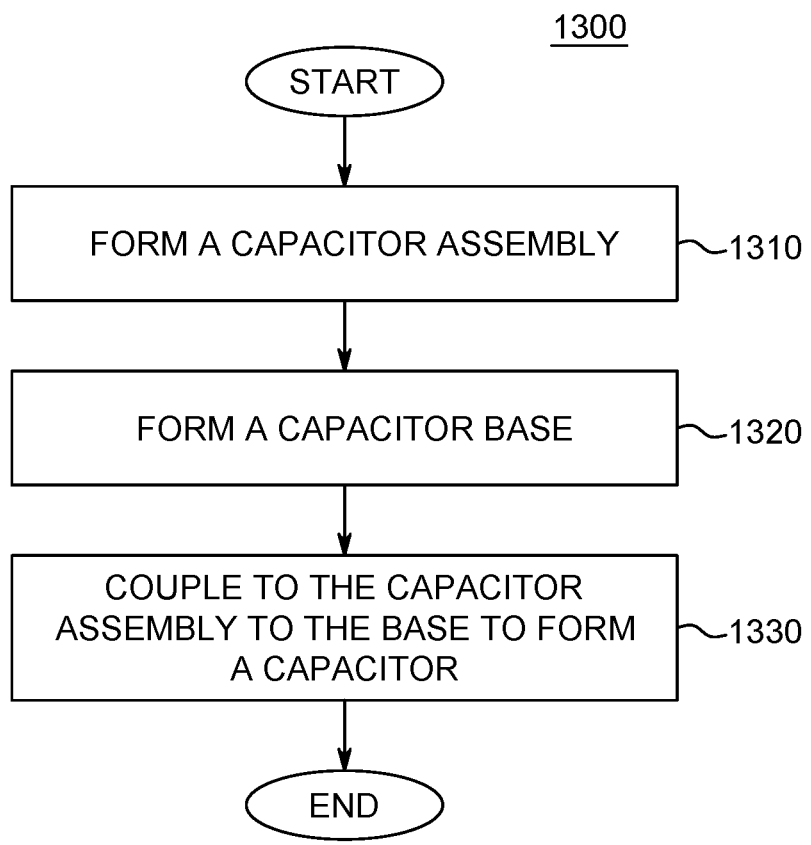
FIG. 14 shows a flowchart of an example of a process for manufacturing a capacitor according to teachings of the invention.

FIG. 14 is a flowchart of an embodiment of an overall process 1300 for manufacturing the capacitor 100. In step 1310, the capacitor body 110 may be formed. The seal assembly 700 may be welded to the capacitor body 110. In step 1320, the base 114 may be formed. The base 114 may include the first contact pads 122 and the second contact pad 124. In step 1330, the capacitor body 110 may be coupled to the base 114 to form the capacitor 100. Coupling the capacitor body 110 to the base 114 may include placing a double-sided adhesive tape over the base 114 and then placing the capacitor body 110 over the double sided adhesive tape. Afterwards, the first contact pads 122 may be welded to the capacitor body 110 while the portion 702 of the connecting member 622 of the seal assembly 700 that protrudes from the seal member 712 may be inserted into a hole on the contact pad 124 and welded to it.

Figure 15:
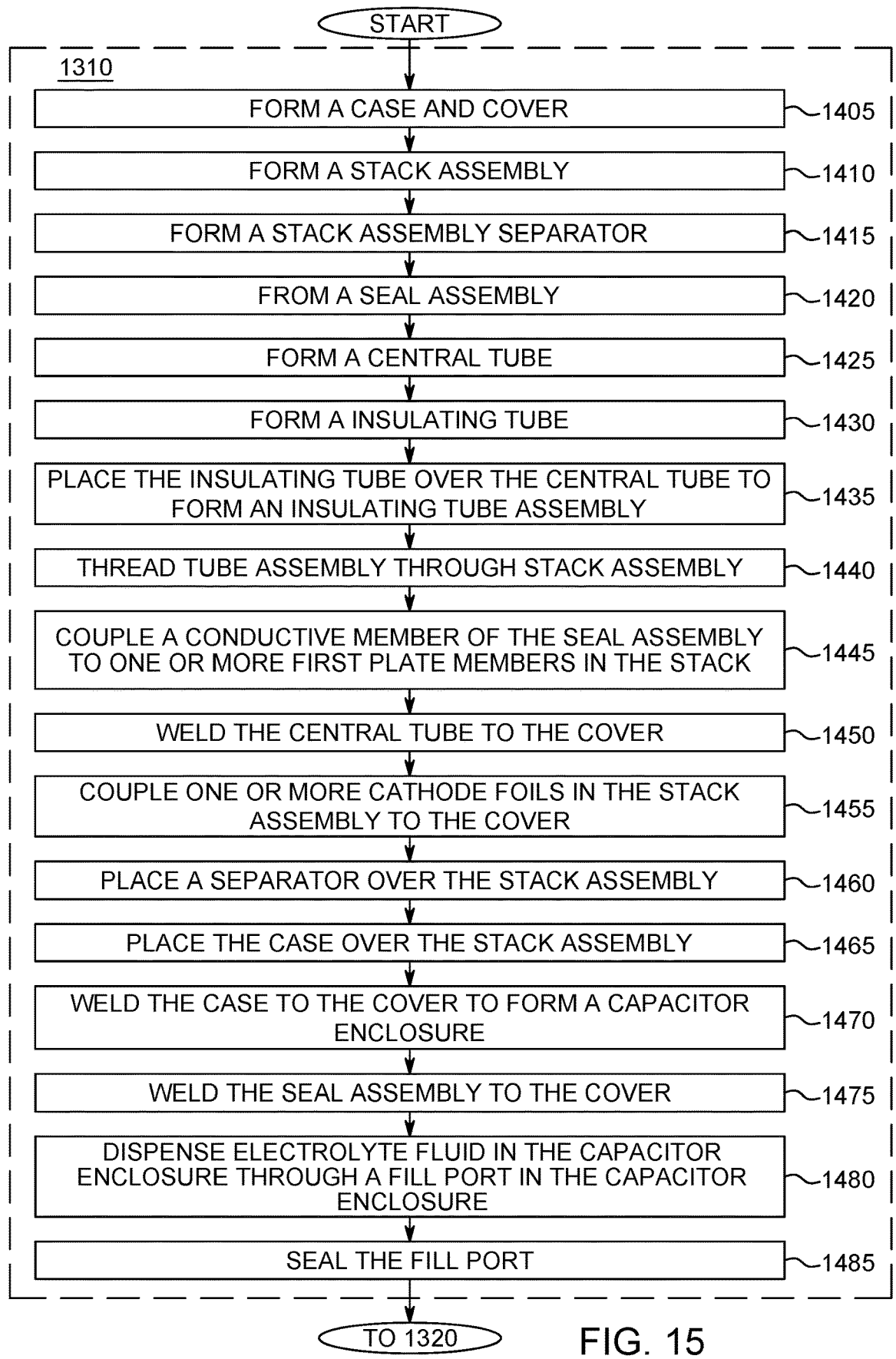
FIG. 15 shows a flowchart of a sub-process associated with the process of FIG. 14.

FIG. 15 is a flowchart of illustrating a sub-process for step 1310 discussed above. At step 1405, the case 112 and the cover 610 may be formed. At step 1410, the stack assembly 906 may be formed. At step 1415, the stack assembly separator 910 may be formed from polytetrafluoroethylene (PTFE) or another suitable non-conductive material. At step 1420, the seal assembly 700 may be formed. At step 1425, the tube 612 may be formed. At step 1430, the insulating tube 904 may be formed. At step 1435, the insulating tube 904 may be placed over the tube 612 to form the tube assembly. At step 1440, the tube assembly may be threaded through the stack assembly 906. The bottom edge of the tube assembly may fit into an opening in the cover 610.

At step 1445, the conducting member 622 of the seal assembly 700 may be welded to the conductive members 320 of the anode plate members 310 that are part of the stack assembly 906. At step 1450, the tube 612 may be welded to the cover 610. At step 1455, at least one tab 514 of the cathode foils 510 may be welded to the cover 610 to form an electrical connection between the tab 514 and the cover 610. At step 1460, the stack assembly separator 910 may be placed over the stack assembly 906. At step 1465, the case 112 may be placed over the stack assembly separator 910. A top edge of the tube assembly may fit into the opening 152 of the case 112. The opening 922 may fit over the tube portion 718 of the seal assembly 700.

At step 1470, the case 112 may be welded to the cover 610 and an electrical connection may be formed between the case 112 and the cover 610. At step 1475, the seal member 712 of the seal assembly 700 may be welded to the case 112 to complete the capacitor body 110. At step 1480, electrolyte fluid may be dispensed in the capacitor body 110 enclosure. At step 1485, the fill port 116 may be closed using the fill plug 118, thereby completing the capacitor body 110.

Figure 16:
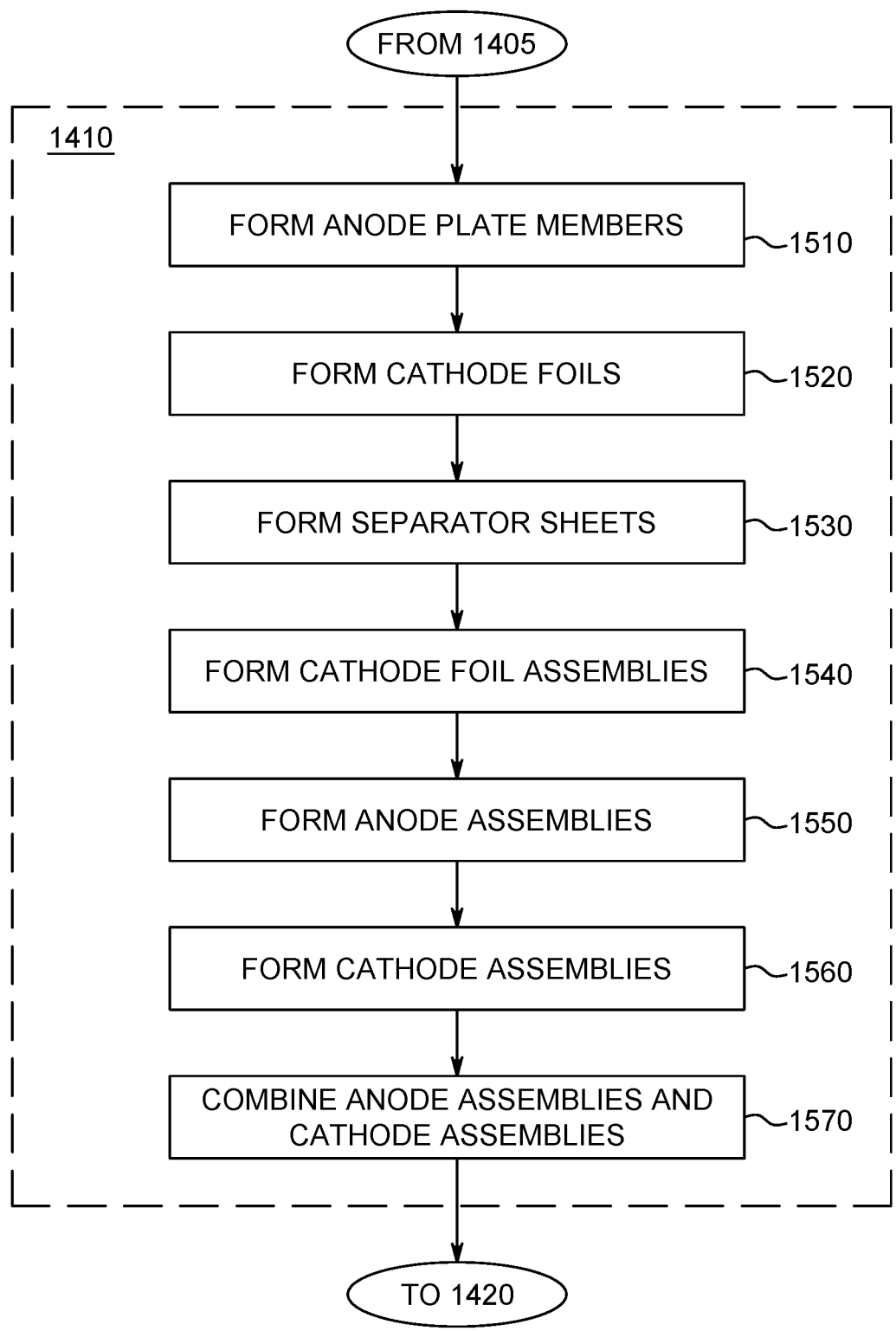
FIG. 16 shows a flowchart of another sub-process associated with the process of FIG. 14.

FIG. 16 is a flowchart of a sub-process for forming the stack assembly 906, as discussed with respect to step 1410 discussed above. At step 1510, the anode plate members 310 are formed. The anode plate members 310 may be formed by pressing tantalum powder in the appropriate shape. The conducting member 310 is embedded during the pressing. The pressed tantalum powder may be sintered in a vacuum at high temperature. An anodization process may be performed in order to form an amorphous dielectric layer.

At step 1520, the cathode foils 510 are formed. The cathode foils 510 may be stamped out of tantalum foil. A palladium cathode layer may be applied to the foil.

At step 1530, the separator sheets 810 are formed. At step 1540, the cathode foil assemblies 908 are formed. As noted above, each cathode foil assembly 908 may include one cathode foil 510 and two separator sheets 810 that are arranged on opposite sides of the cathode foil 510. In each of the cathode foil assemblies 908, the opening 516 of the cathode foil 510 are aligned with the openings 812 of the separator sheets 810 to permit the tube 612 of the cover assembly 600 to pass through the cathode foil assembly 908.

At step 1550, an anode assembly may be formed by welding a plurality of anode plate members to the conductive member 622. At step 1560, a cathode assembly may be formed by spot welding cathode foils 510 to one another and to the cover 610.

At step 1570, the anode assemblies is combined with the cathode assemblies such that the cathode foil assemblies 908 are inserted between the anode plate members 310. The cover 610 may be the very bottom piece. The openings 318 of the anode plate members 310 may be aligned with the openings in the plate member assemblies 908 to permit the tube 612 of the cover assembly 600 to pass through the stack assembly 906 when the stack assembly 906 is placed over the cover assembly 600.

Although the features and elements of the present invention are described in the example embodiments in particular combinations, each feature may be used alone without the other features and elements of the example embodiments or in various combinations with or without other features and elements of the present invention. The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A capacitor comprising:
 a stack assembly comprising a plurality of capacitor elements arranged in a stack, each capacitor element comprising:
  an anode plate member having an embedded wire and a facing surface, the anode plate members each having an opening therethrough,
  at least one cathode foil positioned between adjacent facing surfaces of the anode plate members, the at least one cathode foil having an opening therethrough, and
  at least one separator sheet positioned between the at least one cathode foil and adjacent facing surfaces of the anode plate members, the at least one separator sheet having an opening therethrough;
 a conducting member electrically connecting the embedded wires and having an externally accessible end portion;
 a case covering a plurality of sides and a top of the stack assembly and leaving exposed a bottom of the stack assembly, wherein the at least one cathode foil is connected to the case, the case having an opening therethrough;

a stack assembly separator positioned between at least portions of the plurality of sides and the top of the stack assembly and the case, the stack assembly separator having an opening therethrough;

a cover covering the bottom of the stack assembly and connected to the case, wherein the case and the cover enclose the stack assembly and the conducting member within an interior area of the capacitor;

an electrolyte fluid disposed within the interior area of the capacitor;

the openings through the anode plate members, the at least one cathode foil, the at least one separator sheet, and the stack assembly separator aligned along an axis and forming a passage provided through the stack assembly;

a first tube passing through the passage and connected to the cover and the case, the first tube surrounded by an insulating tube, the first tube comprising a decreased diameter portion, at least a portion of the decreased diameter portion of the first tube received within the opening in the case.

2. The capacitor of claim 1, wherein an angled sidewall is formed at aligned corners of the anode plate members, the at least one separator sheet, and the at least one cathode foil.

3. The capacitor of claim 2, wherein the angled sidewall forms a cavity within the interior area of the capacitor, the cavity configured to provide space for the embedded wires and the conducting member.

4. The capacitor of claim 1, further comprising a base attached to a lower surface of the cover.

5. The capacitor of claim 4, wherein the base comprises a first contact pad in contact with an outer surface of the case, and a second contact pad in contact with the end portion of the conducting member.

6. The capacitor of claim 5, wherein the base forms a mounting assembly for connecting the capacitor to an electronic circuit.

7. The capacitor of claim 1, wherein the end portion extends through the case via a glass to metal seal (GTMS).

8. A capacitor comprising:
a stack assembly, comprising:
  a first anode plate member having an upper surface, a lower surface, peripheral sidewalls, and an opening through a central portion thereof,
  a first embedded wire projecting from a first angled sidewall of the first anode plate member,
  a second anode plate member having an upper surface, a lower surface, peripheral sidewalls, and an opening through a central portion thereof, the second anode plate member positioned adjacent to the first anode plate member with the upper surface of the second anode plate member facing the lower surface of the first anode plate member,
  a second embedded wire projecting from a second angled sidewall of the second anode plate member located below the first angled sidewall,
  a conducting member providing electrical communication between the first embedded wire and the second embedded wire and having an end configured to be accessed externally of the capacitor,
  a first separator sheet positioned adjacent the lower surface of the first anode plate member, the first separator sheet having a third angled sidewall, the first separator sheet having an opening therethrough,
  a second separator sheet positioned adjacent the upper surface of the second anode plate member, the second separator sheet having a fourth angled sidewall, the second separator sheet having an opening therethrough, a cathode foil sandwiched between the first separator sheet and the second separator sheet, the cathode foil having a tab extending therefrom and a fifth angled sidewall, the cathode foil having an opening therethrough;

a stack assembly separator having a top portion and a plurality of side portions extending from the top portion, the stack assembly separator covering a top and a plurality of sides of the stack assembly, the stack assembly separator having an opening therethrough;

a case covering the stack assembly separator and the stack assembly, wherein the tab of the cathode foil is electrically connected to the case, the case having an opening therethrough;

a cover below the stack assembly attached to the case and, wherein the case and the cover enclose the stack assembly within an interior area of the capacitor;

an electrolyte fluid disposed within the interior area of the capacitor;

the openings through the first anode plate member, the second anode plate member, the first separator sheet, the second separator sheet, the cathode foil, and the stack assembly separator aligned along an axis and forming a passage through a central portion of the stack assembly and an upper wall of the case; and a first tube passing through the passage and connected to the cover and the case, the first tube surrounded by an insulating tube, the first tube having a decreased diameter portion received within the opening through the case.

9. The capacitor of claim 8, wherein the first angled sidewall, the second angled sidewall, the third angled sidewall, the fourth angled sidewall, and the fifth angled sidewall are formed at aligned corners of the first anode plate member, the second anode plate member, the first separator sheet, the second separator sheet, and the cathode foil.

10. The capacitor of claim 9, wherein the first angled sidewall, the second angled sidewall, the third angled sidewall, the fourth angled sidewall, and the fifth angled sidewall are configured to form a cavity within the interior area of the capacitor, the cavity providing space for the conducting member, embedded wires and tab.

11. The capacitor of claim 8, further comprising a base attached to a lower surface of the cover.

12. The capacitor of claim 11, wherein the base comprises a first contact pad in contact with an outer surface of the case, and a second contact pad in contact with the end portion of the conducting member.

13. The capacitor of claim 12, wherein the base forms a surface mount assembly for connecting the capacitor to an electronic circuit.

14. The capacitor of claim 8, where the cathode foil is sealed between the first and second separator sheets, and wherein a portion of at least one of the first or second separator sheets extends along a sidewall of the first anode plate member or the second anode plate member.

15. The capacitor of claim 8, wherein the end portion extends through the case via a glass to metal seal (GTMS).

16. A method of forming a capacitor, comprising the steps of:
- forming a plurality of anode plate members each having an embedded wire and having an externally accessible end portion, the anode plate members each having an opening therethrough;
- forming at least one cathode foil, the cathode foil having an opening therethrough;
- forming separator sheets, each separator sheet having an opening therethrough;
- assembling a cathode foil assembly comprising a cathode foil sandwiched between two separator sheets, the cathode foil having the openings in the cathode foil and the separator sheets in alignment;
- assembling a stack assembly by positioning at least two anode plate members in a stacked, adjacent arrangement and positioning a cathode foil assembly between the adjacent anode plate members, the stack assembly having the openings in the anode plate members, the opening in the cathode foil and the openings in the separator sheets in alignment to form a passage;
- electrically connecting the embedded wires to a conducting member;
- covering the stack assembly with a case leaving an exposed portion of the stack assembly, the case having an opening therethrough;
- connecting the at least one cathode foil to the case;
- positioning a cover to enclose the exposed portion of the stack assembly, the cover including a tube extending therefrom, the tube positioned so as to pass through the passage, the tube having a decreased diameter portion, at least a portion of the decreased diameter portion of the tube received within the opening through the case and welded to the case;
- filling an interior area of the capacitor with an electrolyte fluid; and
- sealing the capacitor.

17. The method of claim 16, further comprising the steps of covering the tube with an insulating tube.

18. The method of claim 16, further comprising the step of covering a top and a plurality of sides of the stack assembly with a stack assembly separator prior to covering the stack assembly with the cover.

19. The method of claim 16, further comprising the step of attaching the capacitor to a base adjacent the cover.

\* \* \* \* \*